US007994926B2

(12) United States Patent
Longman et al.

(10) Patent No.: US 7,994,926 B2
(45) Date of Patent: Aug. 9, 2011

(54) NUCLEAR DETECTION VIA A SYSTEM OF WIDELY DISTRIBUTED LOW COST DETECTORS HAVING DATA INCLUDING GAMMA INTENSITIES, TIME STAMPS AND GEO-POSITIONS

(75) Inventors: Andrew Longman, West Lafayette, IN (US); Jere H. Jenkins, West Lafayette, IN (US); Ephraim Fischbach, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 569 days.

(21) Appl. No.: 12/168,669

(22) Filed: Jul. 7, 2008

(65) Prior Publication Data

US 2009/0012745 A1 Jan. 8, 2009

Related U.S. Application Data

(60) Provisional application No. 60/948,101, filed on Jul. 5, 2007.

(51) Int. Cl.
*G08B 21/00* (2006.01)
(52) U.S. Cl. .................. 340/600; 340/539.26; 250/336.1
(58) Field of Classification Search .................. 340/600, 340/500, 539.1; 250/336.1
See application file for complete search history.

(56) References Cited

U.S. PATENT DOCUMENTS

| | | | |
|---|---|---|---|
| 6,031,454 A | 2/2000 | Lovejoy et al. | |
| 7,109,859 B2 | 9/2006 | Peeters | |
| 7,148,484 B2 | 12/2006 | Craig et al. | |
| 7,148,803 B2 | 12/2006 | Bandy et al. | |
| 7,244,930 B2 | 7/2007 | Nelson et al. | |
| 7,339,172 B2 | 3/2008 | Rowland et al. | |
| 7,345,283 B2 | 3/2008 | Gunter | |
| 7,391,028 B1 | 6/2008 | Rubenstein | |
| 2006/0097171 A1 | 5/2006 | Balchunas et al. | |
| 2006/0181414 A1 | 8/2006 | Bandy et al. | |

(Continued)

FOREIGN PATENT DOCUMENTS

KR 10-0577073 B1 4/2006

OTHER PUBLICATIONS

Defentect, "Radiation Detection, Airport Security, Hospital Security," retrieved Apr. 7, 2010, from http://www.defentect.com (1 page).

(Continued)

*Primary Examiner* — Jeffery Hofsass
(74) *Attorney, Agent, or Firm* — Nathan O. Greene; Brinks Hofer Gilson & Lione

(57) ABSTRACT

A radiation detection system includes many receivers to continuously receive radiation emission data from at least some of a sufficient density of dispersed detectors capable of communicating geo-positions and photon emission counts over a network; the data includes gamma intensities, time stamps, and geo-positions. A processor builds digital image data of the received radiation data for a geographic area by treating gamma-ray proton data from each dispersed detector as a pixel in a low-light image. The processor continuously executes a plurality of statistical computational analyses on the digital image data to separate detected radiation signals from random, undesired signal noise, and known signal noise or sources. The statistical computational analyses include match-filter and/or other convolution techniques. An interface reports to a user when the computational analyses result in detection of a radiation signal and reports a location of one or more of the dispersed detectors that contribute to the detection.

49 Claims, 8 Drawing Sheets

U.S. PATENT DOCUMENTS

2006/0290496 A1    12/2006   Peeters
2007/0018806 A1    1/2007   Craig et al.
2007/0018807 A1    1/2007   Craig et al.

OTHER PUBLICATIONS

Splinternet, "Dirty Bomb Threat Detection," retrieved Apr. 7, 2010, from http://splinter.net (1 page).

International Search Report and Written Opinion from corresponding International Application No. PCT/US2008/069333, dated Mar. 25, 2009 (12 pages).

Afeyan, Bedros, et al., "Multiresolution analysis for denoising and pattern detection: Radiation symmetry and the effects of hyrodynamic instabilities on X Ray Implosion Images," retrieved Jul. 2, 2008, from http://www.ipam.ucla.edu/programs/ai2004/ai2004_poster_abstracts.pdf, 4 pages (Jan. 30, 2004).

Gao, "Combating nuclear smuggling: Efforts to deploy radiation detection equipment in the United Sttes and in other countries," GAO-05-840T (Washington, D.C., Jun. 21, 2005), retrieved from www.gao.gov/cgi-bin/getrpt?GAO-05-840T (15 pages).

Hogan, Jenny, "Cellphone sniffs out dirty bombs," retrieved Aug. 12, 2008, from http://www.newscientist.com/article.ns?id=dn6766&print=true, 2 pages (Dec. 2004).

Johnston, Don, "Change will bring opportunity, Miller tells employees," *Newsline*, 31(20):3-8 (Oct. 13, 2006).

Li, Ti-Pei, et al., "Analysis methods for results in gamma-ray astronomy," *The Astrophysical Journal* 272(1):317-324 (Sep. 1, 1983).

Oxford, Vayl S., "Opening Statement: Before the Senate Judiciary Committee, Subcommittee on Terrorism, Technology, and Homeland Security," Retrieved Aug. 12, 2008, from http://kyl.senate.gov/legis_center/subdocs/072706Oxford.pdf, 8 pages (Jul. 27, 2006).

S&TR, "Radiation detection on the front lines," retrieved Jun. 13, 2008, from https://www.llnl.gov/str/September04/Labov.html, 7 pages (Sep. 2004).

Sembroski, G.H., et al., "Likelihood Method for 2-D Gamma-Ray Source Detection," 30$^{th}$ International Cosmic Ray Conference 2007, retrieved from http://scholar.google.com/scholar?as_q=&num=10&btnG=Search+Scholar&as_epq=Likelihood+Method+for+2-D+Gamma-Ray+Source+Detection&as_oq=&as_eq=&as_occt=any&as_sauthors=SEMBROSKI&as_publication=&as_ylo=&as_yhi=&as_allsubj=all&hl=en&lr=, 4 pages.

Tu, S. J., et al., "Geometric random inner products: A family of tests for random number generators," *Physical Review E*, 67(1):cover page and pp. 016113-1 through 016113-7 (2003).

NUCLEAR DETECTION VIA A SYSTEM OF WIDELY DISTRIBUTED LOW COST DETECTORS HAVING DATA INCLUDING GAMMA INTENSITIES, TIME STAMPS AND GEO-POSITIONS

BACKGROUND

1. Technical Field

The present disclosure relates to a system that enables detection of nuclear material, and more particularly, to a system and its software and algorithms for use with widely distributed detectors to detect the same. Furthermore, the present disclosure describes a system, software, and implementations of algorithms for use with widely distributed low cost detectors to detect nuclear materials.

2. Related Art

The physics problem of locating hidden nuclear weapons possesses diverse physical components. Traditional approaches, such as using a "box" located near a "bomb" to detect the bomb, have serious limitations.

Historically, there is the proximity problem (PP). Radiation of various sorts, radiating from a fission device or dirty-bomb, gets dispersed quickly as the inverse of the distance squared. For a detector located at a distance, a small fraction of the initial protons are available for detection. The need to be close to the source has led engineers to station large-aperture detection apparatus at places where bombs might be 'likely' to occur—border crossings for example.

Second, there is the background problem (BP). Alpha and beta emission do not have large penetration distances into what might be termed the normal environment. But, while gamma radiation does not suffer from the same magnitudes of the proximity problem, the cosmic ray, geologic, and other background radiations make bomb signature difficult to distinguish from noise. Where gammas from a bomb can travel long distances from their source, separating which gammas are from a bomb and which are from background has proven to be an obstacle.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting in scope, the disclosure will be described and explained with additional specificity and detail through the use of the accompanying drawings.

DETAILED DESCRIPTION

In the following description, numerous specific details of programming, software modules, user selections, network transactions, database queries, database structures, etc., are provided for a thorough understanding of various embodiments of the systems and methods disclosed herein. However, the systems and methods disclosed can be practiced without one or more of the specific details, or with other methods, components, materials, etc.

In some cases, well-known structures, materials, or operations are not shown or described in detail. Furthermore, the described features, structures, or characteristics may be combined in any suitable manner in one or more embodiments. The components of the embodiments as generally described and illustrated in the Figures herein could be arranged and designed in a wide variety of different configurations.

Several aspects of the embodiments described are illustrated as software modules or components. As used herein, a software module or component may include any type of computer instruction or computer executable code located within a memory device and/or transmitted as electronic signals over a system bus or through wired or wireless network. A software module may, for instance, include one or more physical or logical blocks of computer instructions, which may be organized as a routine, program, object, component, data structure, etc., that performs one or more tasks or implements particular abstract data types.

In certain embodiments, a particular software module may include disparate instructions stored in different locations of a memory device, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Both the PP and BP discussed above are commonly associated with conventional detection techniques, and would be associated with the proposed individual phone-detector-nodes, and in the context of small groups of the same phone-detector-nodes. But the network approach presented herein, which increases the density of these detectors and then uses image processing, randomness, and calculation techniques, frees the individual detector of its normal historical performance bound. Note that the sum of the parts of the present system is greater and different than the components on their own. The aggregation of widely distributed and numerous detectors enable the system to detect nuclear material that would otherwise go undetected.

Figure 1:
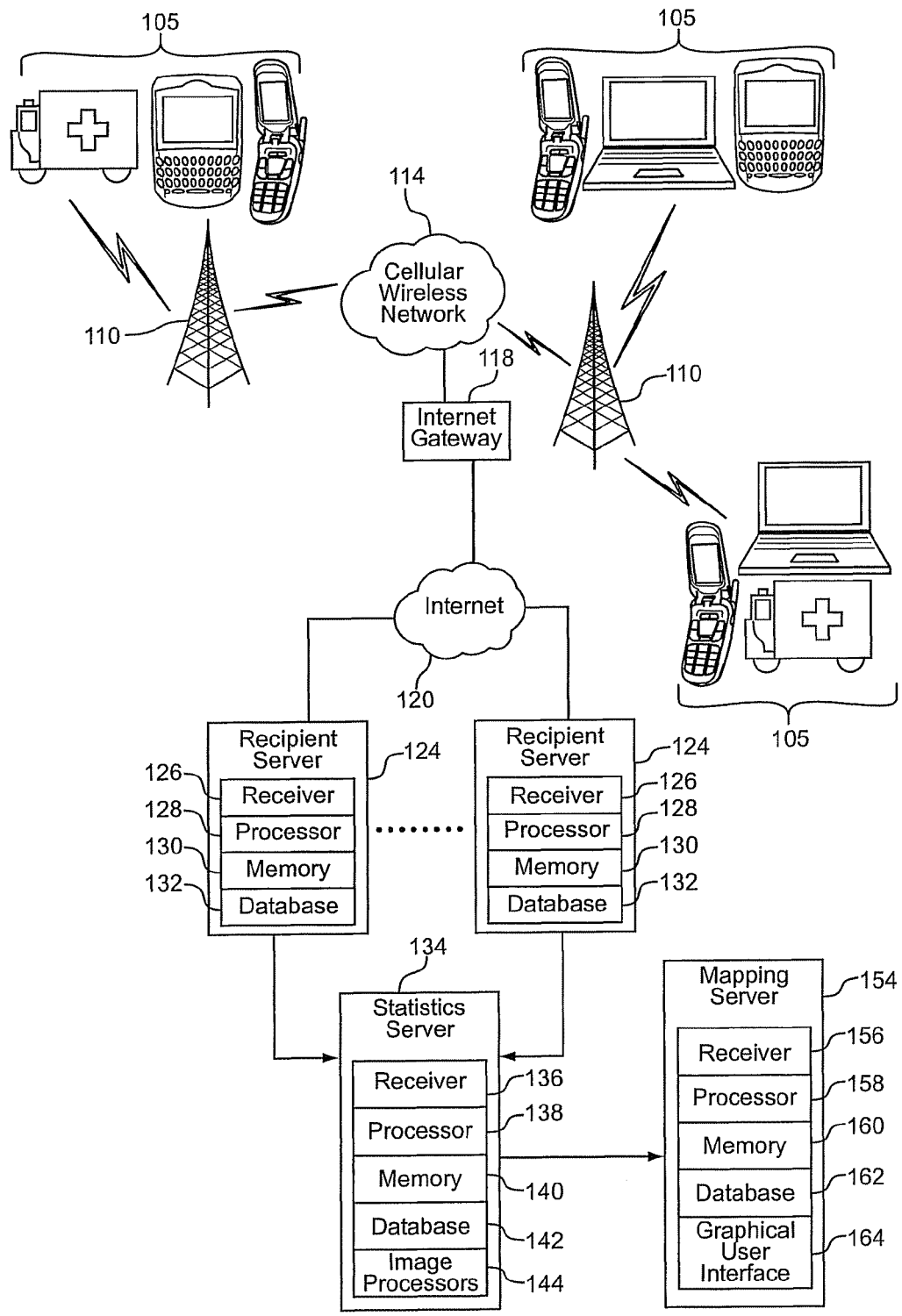
FIG. 1 is a network diagram of a widely distributed networked system of radiation detectors for continuously gathering and statistically processing emission data to enable detection of either concentrated or large sources of nuclear material.

FIG. 1 is a network diagram of a widely distributed networked system 100 of radiation detectors 105 for continuously gathering and statistically processing emission data to enable detection of either a concentration of nuclear material or a large source of nuclear material. The approach of the system 100 to nuclear threat detection is, first, to scatter ubiquitous, low cost, simple, gamma-ray detectors 105 into the field, also referred to herein as field nodes 105. Herein the field may be any geographical area, but with an emphasis on urban areas where the number of deployed detectors is likely to be the greatest to provide a sufficient number of detectors 105 to gather enough emission data to be statistically processed as described below. Urban areas also are more likely targets for a terrorist attack that may include a nuclear device; but, hundreds of thousands and even millions of detectors 105 may be expected within some urban areas, making detection of a nuclear device or nuclear material carried by a terrorist more likely.

The detectors 105 may be included within mobile devices, such as cell phones, and other computing devices, such as semi-mobile devices like laptop computers, and fixed devices such as desktop personal computers or that may be built into city street corners. As non-limiting examples, the mobile devices may also include personal digital assistants (PDAs), pagers, Bluetooth devices, global positioning system (GPS) navigation devices, automobiles, city buses, trains, and aerial vehicles.

The system 100 may further include a plurality of transceiver base stations 110, such as cell towers, which are coupled with a cellular/wireless network 114 infrastructure such as a 3G-UTRAN (3G) network, or older generation networks. Herein, the phrase "coupled with" or "coupled to" is defined to mean directly connected to or indirectly connected through one or more intermediate components. Such intermediate components may include both hardware and software based components. An Internet gateway 118 may be a part of, or otherwise coupled with, the cellular/wireless network 114 so that radiation emission data packets sent by the detectors 105 may be passed through a network 120, such as the Internet.

The detectors 105, either alone or in conjunction with the device in which they are being deployed, are capable of communicating, in real-time, geo-positions and detected photon counts over the cellular/wireless network 114 for routing through the network 120. Certain fixed-position detectors 105 may be hard-wired into the network 120 through a local Internet connection (not shown). The radiation emission data may further include, but is not limited to, gamma intensities, accurate photon detection time stamps, and geo-positions affiliated with the detectors 105. Use of this information with the radiation emission data will be used (as explained below) to maintain a continuously updated account of gamma-ray emissions according to geographical location.

The system 100 may further include one or more recipient servers 124 coupled with the network 120 for receiving the radiation emission data from the detectors 105, wherein the recipient servers 124 are preferably located so that the emission data for a geographical area may be received quickly, e.g., in a matter of microseconds to millisecond depending on various factors. The recipient servers 124 may include a receiver 126, a processor 128, a memory 130, and a database 132 or other storage for storing received radiation emission data as it is received by the receiver 126.

On a regular basis, as fast as current technology allows, the recipient servers 124 send recently-received radiation data and time stamp data for at least a common geographical area to a statistics server 134. The statistics server 134 may also include a receiver 136, a processor 138, a memory 140, a database 142, and an image processor 144. The processor 128 of the recipient server 124 and/or the processor 138 of the statistics server 134 combine radiation emission data from matching geographical areas to build digital image data of the received radiation emission data, and time stamp data, for a geographical area. The processors 128, 138 perform the combining by treating emission data from individual detectors 105 as pixels in a low-light image or photo or a series of low-light images or photos. If the combining of the digital image data is performed by the recipient server 124, the digital image data is stored in the database 132 to be sent to the statistics server 134 on a regular basis. The statistics server 134 then would have less processing to do in being able to simply combine digital image data of geographical areas of individual recipient servers 124 to form digital image data files of larger geographical areas within a region.

The digital image data is then statistically processed by the image processors 144 as would be a low-light image or photo to detect features or anomalies therein. The time stamp data can allow the image or photo, in a series of images or photos, to be time dependent. Accordingly, the images may be constructed to represent periods of time as well as areas of geography. To do so, the processor 138 continuously executes a plurality of statistical computational analyses on the digital image data, which will be discussed in more detail below. The statistically-processed digital image data is used to update previously-stored digital image data for the same geographical area in the database 142. For manageable processing and storage, the geographical areas within a region may be broken down as determined by distributed software, for instance. The distributed software executed across the recipient servers 124 and/or the statistics server 134 assigns radiation data from each dispersed detector 105 to one or more of the image processors 144.

On a regular basis, as fast as current technology allows, the statistics server 134 sends the statistically processed digital image data to a mapping server 154. The mapping server 154 may include a receiver 156, a processor 158, a memory 160, a database 162, and a graphical user interface (GUI) 164. The processor 158 combines the digital image data as an overlay on top of a digital map of the corresponding geographical area on the GUI 164 for viewing by users thereof. The users may include first responders or other emergency or law enforcement personnel tasked, and trained to monitor the displayed digital imagery. A detection node (not shown) that is traceable by the recipient servers 124 may be included in any known nuclear source (e.g., spent fuel from a nuclear power plant, weapons grade nuclear material, or an actual nuclear bomb or missile) moving through the geographical area. The mapping server 154 can configure its imaging software to subtract out or remove known nuclear sources so they are not displayed through the GUI 164. Accordingly, the imaging software may either display or not display known nuclear source. The software can be further configured to distinguish between the locations of known nuclear material, licit nuclear material, and illicit nuclear material. The image software configuration can also be configured based upon a user, which would permit display of information. Similarly, as discussed herein, the known sources of nuclear can also be subtracted from calculations made to locate nuclear materials that are unknown or illicit.

As depicted in FIG. 1, any combination of the recipient servers 124, the statistics server 134, and/or the mapping server 154 may be combined as a single server depending on the geographic expanse of the area being monitored in any given region. To speed up the receipt and communication of emission data, more recipient servers 124 may be deployed as areas become more urban or as urban areas expand and grow. Recipient servers 124 may be configured to pass data between or amongst themselves. Recipient servers 124 can be deployed either alone, in co-located server arrays, distributed meta-computer configurations, or combinations thereof to provide redundancy and/or flexible computing power. As a result, the flexible, extensible, and redundant features or nature of the configuration of recipient servers 124 aid the recipient servers 124 to perform a variety of functions. Accordingly, the system has several advantages. First, the flexible extensibility of the data processing and storage capabilities of the recipient servers 124 permit the recipient servers 124 to handle various numbers of detectors 105. Second, the networked nature of the recipient servers can allow the recipient servers 124 to be independent of the location of the detectors 105. Alternatively, based upon security or other limitations, a recipient server 124 can be deployed nearby the detectors 105. Second, the extensibility and flexibility of the architecture of system 100 limits the impact of inoperative or destroyed recipient servers 124. Accordingly, the loss of one or more of the recipient servers 124 or arrays of recipient servers 124 should not severely impact the ability of the system 100 to continue to receive and process radiation emission data. The statistics server 134 and the mapping server 154 may easily be combined as a single server, which is envisioned as an alternative embodiment. Redundant deployment of the servers 124, 134, and 154 is also be envisioned to enable serves to reroute necessary calculation task as part of routine contingent emergency measures so that the system 100 remains operational during blackouts, natural disasters, attacks, etc.

Figure 2:
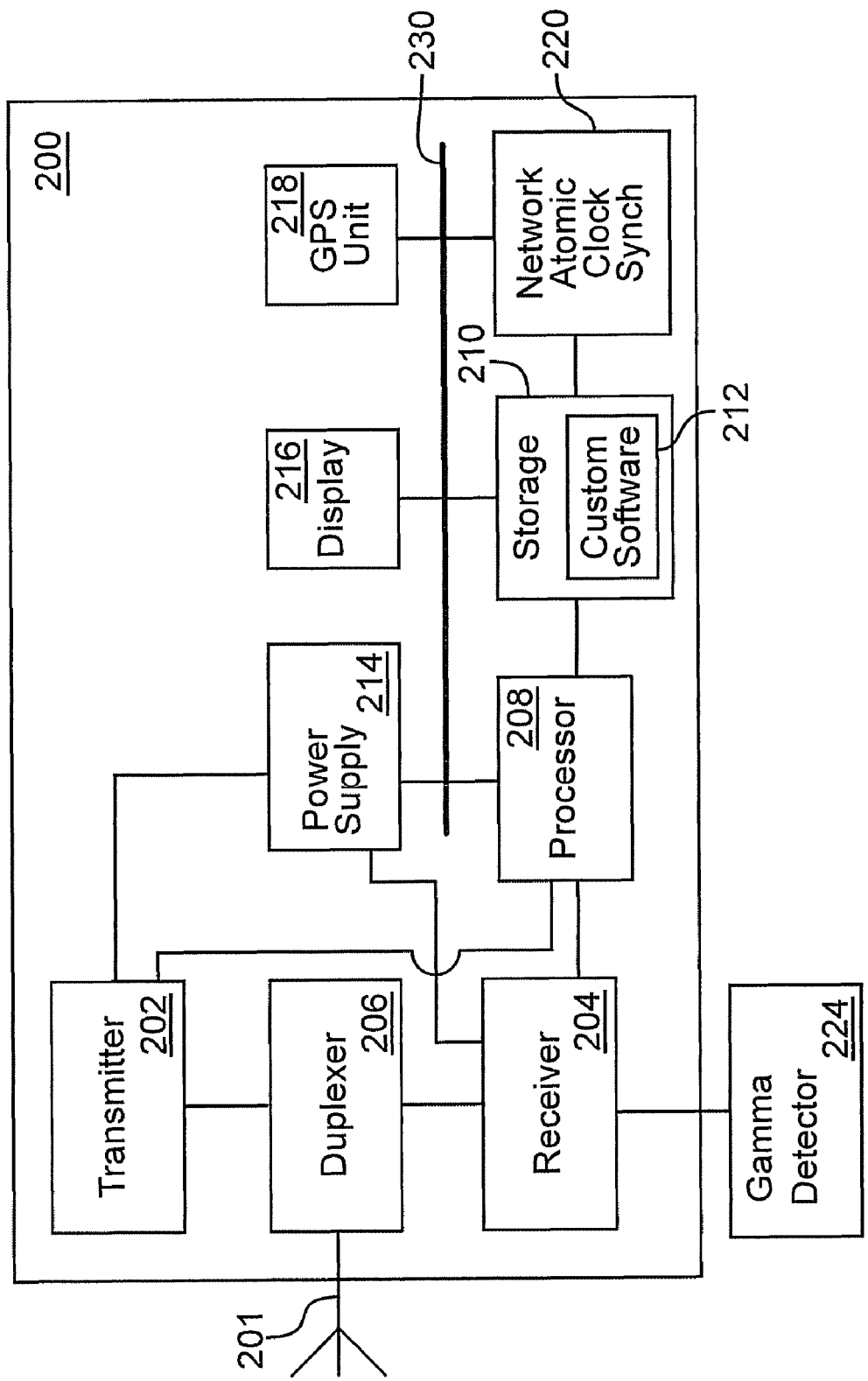
FIG. 2 is a device diagram of an exemplary mobile device, usable as one of many detectors to provide radiation emission data in the network of FIG. 1.

FIG. 2 is a device diagram of an exemplary mobile device 200, usable as one of many detectors 105 to provide radiation emission data in the network of FIG. 1. As discussed, the mobile device 200 is preferably low cost and simple so that a desired level of ubiquity in deployment is achievable. For the examples of studies disclosed herein, the mobile devices 200 with the detectors 105 are assumed to always be powered on. Even so, the mobile devices may sometimes be in other various operational states, e.g. powered on, standby, powered off. The mobile device 200 may configure detectors 105 to collect data or not collect data based upon the various operational states. Accordingly, the system works with data available during node on-time. The system 100 runs in the phone background, transparent to the user, and does not required user interaction.

The exemplary mobile device 200 includes an antenna 201, a transmitter 202, a receiver 204, a duplexer 206, a processor 208, a storage 210 including custom software 212, a power supply 214, a display 216, a global positioning system (GPS) unit 218, and a network atomic clock synch module 220. As a non-limiting example, the receiver 204 may include a gamma detector 224, such as a Geiger-Müller (GM) tube, or other gamma detector suitable for the application. For instance, a silicon wafer, a scintillator, or a combination thereof may be employed or interchangeably used.

In an exemplary embodiment, the antenna 201 may be coupled to both the transmitter 202 and the receiver 204, or the transmitter 202 and the receiver 204 may be connected to respective antenna units. In one embodiment, the duplexer 206 is coupled to both the transmitter 202 and to the receiver 204 to selectively switch between received and sent radio signals. In another exemplary embodiment, the processor 208, the storage 210, the power supply 214, the display 216, the GPS unit 218, and the network atomic clock synch 220 all communicate through a communications bus 230. The communications bus 230 is operable to transmit control and communications signals from and between the components connected to the bus 220, such as power regulation, memory access instructions, and other system information. In this embodiment, the processor 208 is coupled to the receiver 204 and to the transmitter 202.

The mobile device 105 is configured so that, with the execution of the custom software 212, the GPS unit 218 can determine geo-locations to high levels of accuracy (often within one to three meters), the Gamma detector 224 can detect gamma-ray intensities through photon emission counts, and the network atomic clock synch module 220 can synchronize with network time protocol (NTP) built into the cellular/wireless network 114 or with a GPS network. As a non-limiting example, in some embodiments, time synchronization or measurements may be based upon a time-synch signal of a GPS network, which is linked to an atomic clock, and which provides a verified time base. Alternatively, a synchronization or time measurements can be based upon information available through the network or internet. The NTP syncs local time of a mobile device clock-calendar with NIST Internet Time Service, or some other similarly accurate time synchronization service. The respective geo-locations, the gamma-ray intensities, and the time stamps may then be stored in the storage 210 and/or directly communicated to a recipient server 124 through the transmitter 202 and antenna 201 to a base station 110. Note that use of cellular tower triangulation to determine location of a mobile device 200 is generally not acceptable as it is currently performed because it is not sufficiently accurate. Likewise, use of a standard non-atomic-clock-synched clock in the mobile device 105 is also generally unacceptable.

Because many of the detectors 105 are mobile devices 200 that will be moving much of the time, the accuracy of the statistical processing of the digital image data depends upon accurate geo-positioning data and time stamps coming with the radiation emission data. Geiger-Müller (GM) tubes are inexpensive and may be made to various sizes to be located in various-sized devices. To some extent, the larger the GM tube in these devices, the stronger the detector 105 is that incorporates the same. Other detectors 105 besides the GM tube detectors, however, are envisioned and the scope of the current disclosure is not limited by the specific type of implementation of the detectors 105 so long as the requisite accuracy of photon count emissions detection is achievable. For instance, a GM tube, a silicon wafer, a scintillator, or some combination thereof may be used in alternative embodiments.

Even semi-mobile or fixed-location detectors 105 could be adapted to include similar features of the mobile device 200, and accordingly, reference to a detector 105 herein may include the detailed aspects of the mobile device 200. Other devices, including fixed-location devices, may be adapted to include the detectors 105 to fill in gaps of geographical coverage that may exist because of a lack of normal traffic stemming from movement of the mobile devices 200. Accordingly, further to what was previously discussed, the detectors 105 may include various other types in addition to mobile devices 200, including: (1) medium aperture detectors built into semi-portable devices such as laptops; (2) larger aperture detectors built into desktop computers; and (3) huge aperture detectors built into city buses, government, and/or police-force vehicles, which detector apertures would be many feet long by many feet wide. Garbage-can sized detector apertures could be built into city street corners, and larger-sized detector apertures could be built into police cars, fire engines, or other emergency vehicles. Unmanned aerial vehicles could also have built therein larger or huge aperture detectors to cover areas generally devoid of mobile device traffic. Such complete, and layered, detector coverage, to the extent it is achievable, benefits the accuracy and reach of the detecting power of the system 100.

The hardware of the system 100, as discussed above, distinguishes itself from current systems in at least two ways: ubiquity and random motion. In placement of the detectors 105 in every cellular phone (200) inside an urban population, both the numerous presences, and the random motion, of these detector nodes 105 provide a complete reframing of the task. In a recent computer simulation of Indianapolis' urban center, 47% of the city's area was swept with credible detection in a little more than two minutes where cell-phone users were considered to walk about normally carrying detector devices 200.

Next, the structure of ubiquity and random motion for the detectors opens up approaches in software and mathematics never before attempted because they were not plausible. By treating the field nodes or detectors 105 as collection pixels in a low-light imaging system, techniques from astronomy, industrial image analysis, and statistics, can be used to "photograph" populated areas. Whereas background noise is not geometrically coupled in general, point-sources of gamma emission, such as a hidden terrorist device, have a strong relationship to geometry. A light source, hidden in the noise, can be discovered and located within the noise by computational image analysis where that image is constantly being re-photographed by the wandering detector nodes 105. Since detector density goes as population, detector density also is distributed according to the terrorist enemy's desire; highly populated areas become highly detected areas.

So, the problem is transformed into an image analysis issue by employing this physical networked structure of the system 100 and many mathematical methods may then be applied. Roving detectors 105, 200 sweep out areas and greatly mitigate noise by repeatedly sampling background. Faint sources buried in the noise are separated from noise by the mathematical and geometric differences that the signal and noise possess. Also applied are geometric probability and physical randomness to separate what is signal from what is noise.

Next, the system 100 quantifies the physical randomness of nuclear decay. Subtle differences in physical randomness, spatially, and time, can measurably distinguish sources from background. Following each node 105 and whole geographic areas with physical randomness analysis allows computational measures that quantify when signals in a region depart from expected randomness metrics. The proximity problem is largely solved with a large number of scattered, detector nodes 105, which include mobile devices 200 having telephone-based gamma-ray detectors and other semi-mobile and fixed detectors as discussed above. An additional aspect of solving the proximity problem, as discussed, is the ability to layer detection with semi-mobile and fixed detectors. The detector nodes 105 are equipped with the custom software 212 and the GPS unit 218 so that the gamma-counting and geographical location data are constantly transmitted, via Internet data packet, to a computational center such as the statistics server 134. Because the scattered, mobile phone-based nodes 200 employ inexpensive, mass producible, readily available technology, it is possible to create the ubiquity sought.

Cellular telephones are produced at a rate of about 1 billion per year. In 2005 there were over 180 million cellular subscribers in America. If each cellular telephone is considered as a gamma detector (200), the proximity between a hidden nuclear bomb and a constellation of nearby phones becomes an immediate solution to the proximity problem. There are approximately 75 people per square mile spread over the entire surface of the United States, but this figure does not compare to the population densities of urban areas (1990 US Census data): 2,000 people per square mile in Indianapolis, 3000 in urban Sacramento, 7,400 in Los Angeles, and 26,700 in New York City.

Terrorists seek to target high population densities in order to kill as many people as they can. If the system 100 were implemented nation-wide, detector density, and thus resolution, would track as proportional with the risk of the target. Location that terrorists would most likely attack, such as New York City, with a nuclear weapon would have the highest density of detection also present in that population, thus making it one of the most difficult places to smuggle in a nuclear device and remain untracked.

To give a concrete example of how well cell-phone based (and other) detectors 105, 200 work, consider a first order detection scenario. A 5 millicurie (mCi) source produces a signal in a very low-tech 2 cm×1 cm Geiger-Müller (GM) tube 224 such that counts are discernible above local background at a distance of 3.1 meters. This small detector cylinder (224) is then built into the cell phones of Indianapolis residents. In locations or under circumstances where GPS or internet access is intermittent, nodes record the data to the extent possible. The nodes can be further configured to analyze the recorded data to determine whether the data has sufficient quality to be useful. The quality analysis may include identifying indicia of reliability within the data. The nodes then transmit the data judged to have sufficient quality upon restoration of connectivity to the network, e.g. internet.

Before any of these residents move from their randomized initial locations, they are already sampling about 3% of the city's entire land area. If their walking-steps are considered to be a distance of about 70 cm, in taking 6 steps in some random directions, 5% of the city is quickly swept out. And, if those residents were to continue to walk urban pathways at random, the simulation shows that in about 2 minutes of continuous walking, as much as 47% of the city's area is swept over by detection that could credibly have a chance of measuring a gamma signal from the 5 mCi source. The random motion of the individual detection node 105 and the high-density of detectors 105 mean that, effectively, the entire populated area of Indianapolis is swept and re-swept with detection multiple times per day. See FIGS. 3A and 3B. These results could, of course, change to improve with advancing technology, or worsen based on a shrinking population size; accordingly, the results are provided as a non-limiting example. But, the networked structure of the system 100 opens many new opportunities to solve the background noise problem because now the incoming data set is revolutionized in its ability to be processed and analyzed statistically and mathematically.

Gamma-ray astronomers and industrial vision engineers have created computational techniques for separating known signals from known and unknown noise in digital images. Gamma-ray astronomers are especially familiar with finding stars in the midst of a low-light, high-speckle charge coupled device (CCD), low-photon-count, raster images. By using the sea of detectors 105, 200 as low-light imaging pixels counters, the recipient servers 124 collect incoming gamma count data from as many detectors 105, 200 as possible and assemble low-light images of whole geographic areas. Changing the problem from its first state into a low-light imaging process unlocks the machinery of many sophisticated and powerful methods.

A hidden nuclear device, by the very nature of physical geometry, emits photon-count via the inverse square law.

This, on an aerial gamma photo would look like a "star" or bright-spot at a certain location, surrounded by another sea—one of speckled noise. The noise, when it comes from cosmic rays or random decays in the local material, is mostly a random occurrence not strongly coupled spatially. Image processing techniques work best when the signal buried within the noise is a known structure. Good ideas exist about what that signal ought to look like spatially and, as such, a very good ability exists with which to separate signal from noise. Astronomers have, in fact, defined this particular problem in optimized mathematical terms—techniques exist for proving the obtaining of the highest possible signal to noise photo separation that data can render if the hidden function's form is known.

There are multiple computational techniques which may be applied once a physical network of randomly moving detectors 105, 200 is constructed. Knowing the location of this large number of simple detectors, for example, over time a complete count survey map of entire areas may be constructed. By being aware of, say, the granite steps on the front of a building, for example, the background from those steps can then be subtracted or removed from subsequent computational-cluster calculations. Over time and many sweeps, the highly spatially defined background becomes known such that deviations from it become all the more detectable. Because of the fast nature with which a sea of random wandering detectors 105, 200 refreshes the data set, areas may be regarded like low-light snap shots or images, and this transforms what statistics can achieve.

When a sea of detection nodes 105, 200 are properly feeding data into the recipient servers 124, detection will far outstrip the signal-to-noise performance of any individual gamma counter on its own. This is at least because signal-to-noise statistics and concepts bear inherently on the specific measurement properties of noise. A complete data set for a geographic area, which contains a bomb, may be searched using a match-filter (not shown), which may be executed by the processor 128 and/or 138. A match-filter output can be analytically shown to present the best signal to noise ratio, if a known signal is searched for in the data set. Alternative embodiments and variations on this theme will be explored. The application of match-filter algorithms, which are types of convolution techniques, is new in at least (a) first creating images with random moving detectors, and (b) then finding bombs in those images via this method.

While no one detector 105 on its own would potentially notice anything out of the ordinary (or be essential to the system 100) by sifting the data from many detectors 105, 200, the spatially dependent nuclear device signal is separated from the more or less spatially independent cosmic ray background. There are multiple mathematical approaches to this. For a second example, the gradient of the bomb signal output is spatial whereas cosmic ray background has little spatial structure. If a predicted gradient matches a measured one, a device or source may be present. The system 100 renders this unique result, which the individual components cannot: multi-dimensional spatial signal from bombs is strongly separated from non-spatial cosmic ray background noise.

The system 100 has another major mathematical approach once the physical and computational infrastructure has created data sets which can be operated upon. An individual detector 105, 200, roaming through its day, would expect to encounter background in more or less a random fashion. A program set to measure the randomness of each individual node's experience reports a quantitative set of metrics for the randomness experience of that node 105. Continuing, the two-dimensional maps of detection over a geometric area report certain quantitative measures of random activity. As a background database grows, randomness measures are tuned to different sectors of geography. If a photon source were to enter a given region, or if disturbances of the physical randomness measures of groups of detectors are noticed, that physical randomness is measured, and compared to known measures of the same. As described herein, detection of the proton source or disturbance of the physical randomness can be determined based upon a function of the measured physical randomness and the comparison of the measured physical randomness to the known randomness. Two-dimensional areas possess randomness metrics, and individual detector-node paths possess randomness metrics. Finally, detector nodes 105, 200 over the course of their lifetime possess randomness metrics. These three are calculable and comparable to historic trends, and stored in a database, such as databases 142 and/or 162. The presence or absence of a hidden bomb in an area, near a pathway, or in the history of an individual detector, is then detectable by measured different in randomness.

The relevance of solving the proximity and the signal-to-noise problems to render large improvements mean that, were the system 100 implemented nation-wide, defense and responder forces would have the ability to track and categorize hidden threats in the wide and general areas of an urban environment. No longer would security forces have to rely on single-location data. Data can be presented to security forces in a multi-dimensional manner. As a non-limiting example, data can be presented to securities forces as being two and/or three dimensional rather than one dimensional in nature. A temporal dimension can be used to detect movement in the location of the nuclear material. Computational measures would present hot spots with quantitative measures of intensity, confidence level, and whether or not the sources were moving. To begin with, while a background database is constructed, this would involve a lot of categorization work. But, as hot-spots are swept multiple times, their nature would become increasingly measured and well defined.

At present, spectroscopy teams confined to vehicles or hand-held devices are faced with finding a needle in a haystack. But using ubiquitous detection and sophisticated equipment such as the statistics and mapping servers 134, 154, teams are sent only to GPS coordinates that are known to matter at some level—the areas of highest needle probability are well defined as will be explained in more detail below. After a team sweeps a hot-spot thoroughly, they need not return again until the network notices a substantial change. The networked system 100 provides national defense with whole new mapping and locating possibilities. In addition to greatly improving the proximity problem and the signal to noise problem, this approach allows for "placing a dot on the map" for many bomb scenarios.

The system 100 provides constant radiation map field survey data. Central to literally every kind of nuclear security detection and algorithm is having a good grasp of the local background sources. While the system 100 provides itself essential information for detection, a background database such as 142 or 162 could be shared with virtually every other nuclear inspection device in the country. This field survey would constantly be self-refreshing.

Lastly, the system 100 may function as a major piece of disaster infrastructure after the event of a nuclear detonation. If a fission or dirty bomb scattered fallout around an area via wind and other transport, having a geographic map of where the fallout is and what intensities must be avoided, would be invaluable both to planners and to the public. Avoiding panic stampedes, routing over safe highways, and quick aquifer safety characterization, could all benefit from having this constant background map.

Figure 3A:
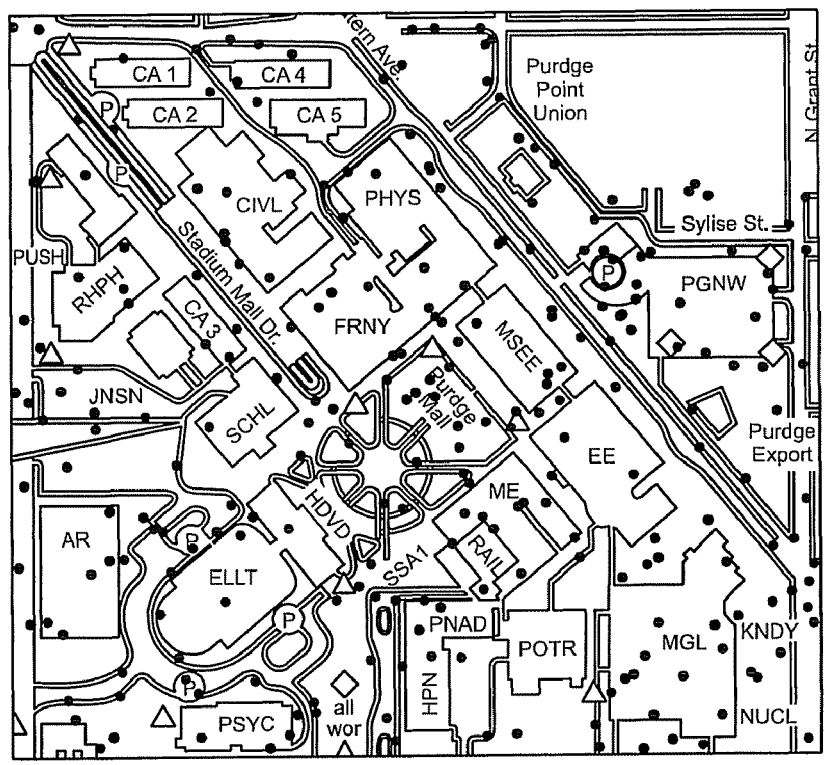
FIG. 3A displays an example of a density of proposed detection nodes at the Purdue academic campus, each dot representing an arbitrarily shaped 3-meter radius detection zone.

FIG. 3A depicts a non-limiting example of a density of proposed detection nodes 105 at an academic campus, where each dot represents a 3-meter radius detection zone around each person. FIG. 3A depicts location of the power of mobile devices 200 equipped with the proposed detection nodes 105. FIG. 3A depicts an area about 620 meters by 570 meters. The outlines represent buildings and streets. Thousands of people inhabit these buildings on a typical work day. If we distribute 2,000 people per square mile (recent population density of Indianapolis, Ind.), each carrying a detection node 105, and we ascribe to each of those detectors the power to sweep clean a radius of about 3 meters around the node, then about 3% of the entire urban area is covered with detection before anyone has taken a single step. This is an expanded discussion of the example mentioned early, and provides only approximates for purposes of the example.

Figure 3B:
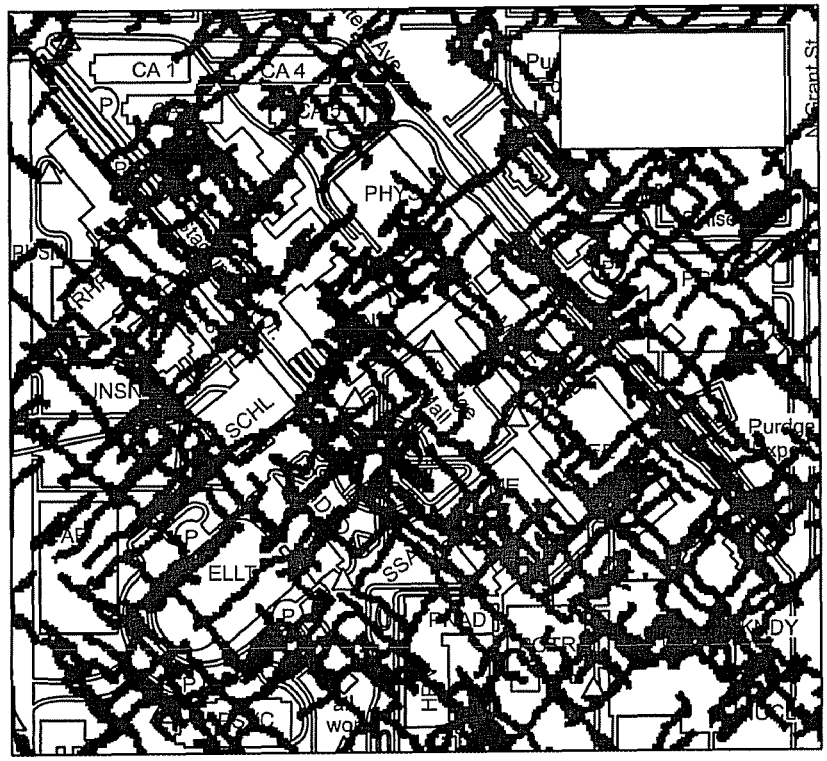
FIG. 3B displays the same example as FIG. 2A, but after 125 seconds of elapsed time during which the detection nodes migrate through walking.

FIG. 3B displays the same example as FIG. 3A, but after 125 seconds of elapsed time during which the detection nodes 105 migrate through walking. The people's walking is simulated along random paths, allowing a quick sweep of the urban area. Carrying their 3-meter detection pool with them, these people have bathed 47% of the urban area in detection. Obviously, the effective area of this detection pool depends on a number of things. But even a very small effective detection radius, utilized by a large population density, can quickly scour a region because of the networked motions. Further, because of the presence of multiple nodes 105 in an area, signal strengths from the nodes 105 can be used to supply not only more precise location information, but hidden source strength.

For another first-order measure of effectiveness, consider the time that it takes for three different nodes 105 to stumble onto a hidden device, where "detection" constitutes the given node 105 taking signal which rises above a local background threshold number. The threshold may be set somewhat high. In addition, the location of the hidden device (bomb) may be distributed in a random fashion. The location of detection-nodes may also be distributed at random. For example, in one embodiment the threshold may be set to twice the local measurement background. Consider the archetype population density of Indianapolis, Ind. and look for a source using the simplistic, multitude of low-efficiency detection nodes. In this scenario, the threshold-radius of detection is again about 3 meters. The simulation proceeds to allow detectors 105, 200 to wander and notes when one, then a second, then a third different node 105 rises over a threshold. When the third different node 105 rises at least above the threshold, i.e. coming within 3 meters to the hidden device, the simulation concludes. Repeating that 200 times with randomized variables gains an understanding of how long it takes to get sufficient detection within sufficient proximity to locate a device, where the location of the device to the first order is based upon use of a relatively crude detection technique. Shown in Table 1 is time as tracked until the first, second, and third nodes find the hidden device, including average, standard deviation, maximum, and minimum times.

TABLE 1

| 200 trials | Ave. (minutes) | Max (minutes) | Minimum (sec) |
|---|---|---|---|
| Find 1 Ave | 3.0 | 23.9 | 0 |
| Find 1 Stdv | 3.6 | | |
| Find 2 Ave | 4.2 | 35.3 | 1 |
| Find 2 Stdv | 5.1 | | |
| Find 3 Ave | 10.0 | 44.4 | 4 |
| Find 3 Stdv | 7.7 | | |

Roughly speaking, then, if every person in Indianapolis carries an inefficient detection node 105 in his/her cellular phone 200, and a millicurie level device is hidden and emits radiation, this scenario indicates that it would take between 4 seconds and 44 minutes for 3 distinct phones 200 to each rise above a crude threshold due to moving near that source. While scenarios vary and assumptions are involved, this gives an excellent order of magnitude understanding for the power and utility of random motion, ubiquitous detection, and the limitations terrorists would face before the advanced system, methods, and implemented useful algorithms as described in the embodiments herein are even applied to the data.

Figure 4:
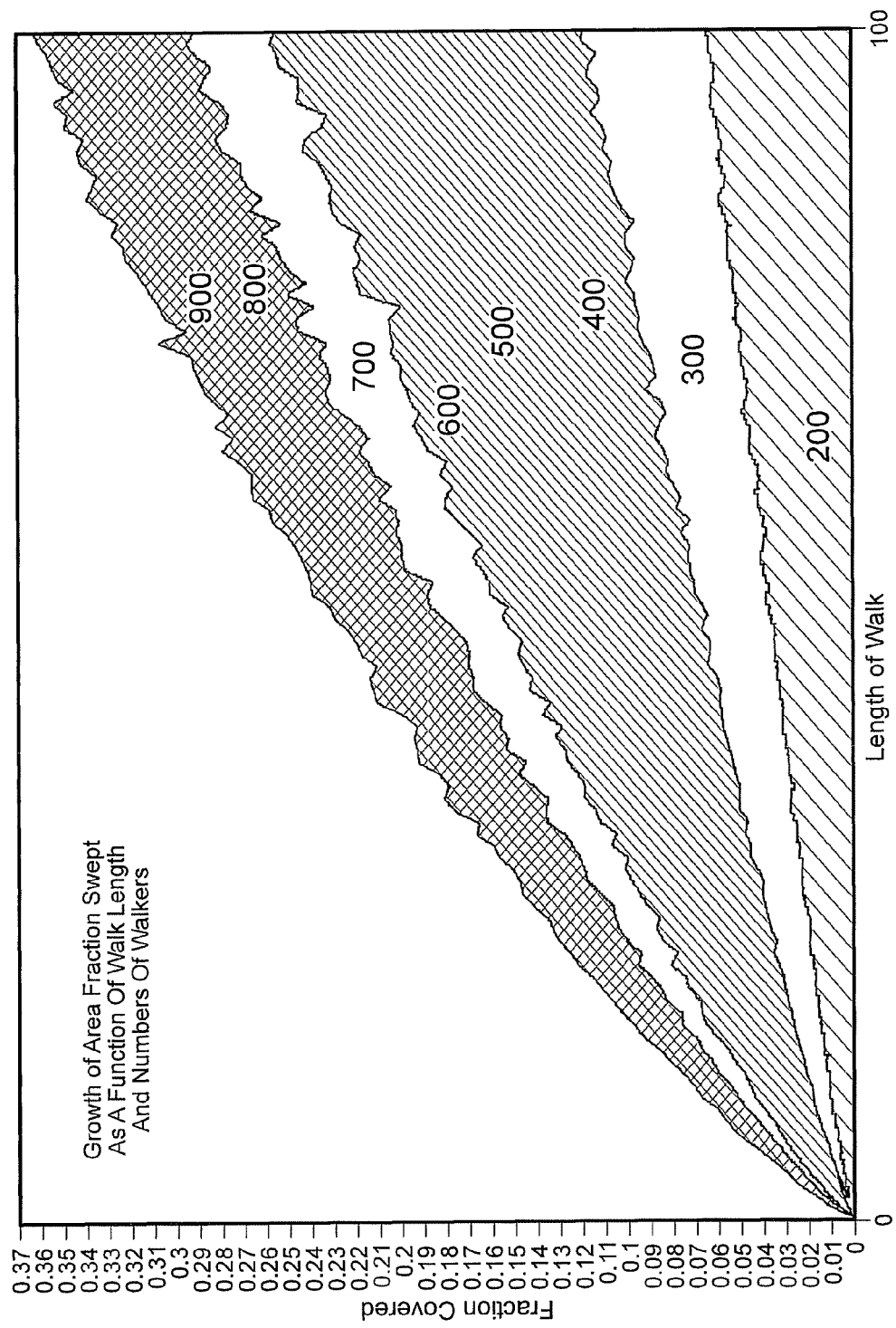
FIG. 4 displays a chart that shows the growth of a typical area fraction swept as a function of walk length and number of walkers for a typical bomb detection scenario.

FIG. 4 displays a chart that shows the growth of area fraction swept as a function of walk length and number of walkers. To generally understand how the growth of detector density affects coverage to order of magnitude, shown is an example plot of the number of people walking around and how far they walk. The walk length (horizontal axis) units here are in steps of a normal person. The fraction covered (vertical axis) expresses the amount of geographic area swept over by credible detection during the walk. The number of walkers is expressed in hundreds. For 900 walkers in a sample-defined scenario (about a ½ square mile range, fixed threshold detection radius), taking 100 steps results in about 36% of the city-area getting visited. The higher population density strongly grows coverage in a fairly short walk-about, and above a certain level, nearly all of the area will be swept in a fairly short time.

Figure 5A:
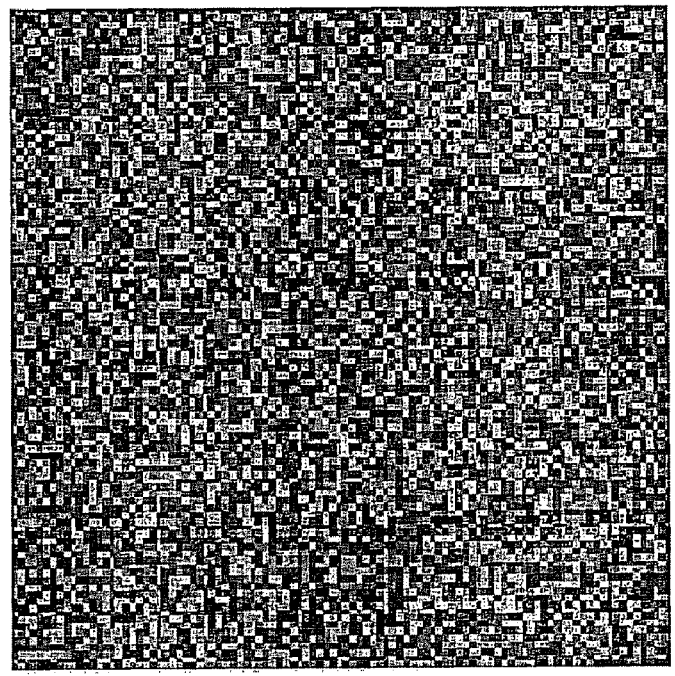
FIGS. 5A and 5B respectively display [0, 100] count per second of random noise, per unit area or volume, at a sample location and 5,000 counts per second source (measured a short distance from the source) immersed in that noise (shown circled).
Figure 5B:
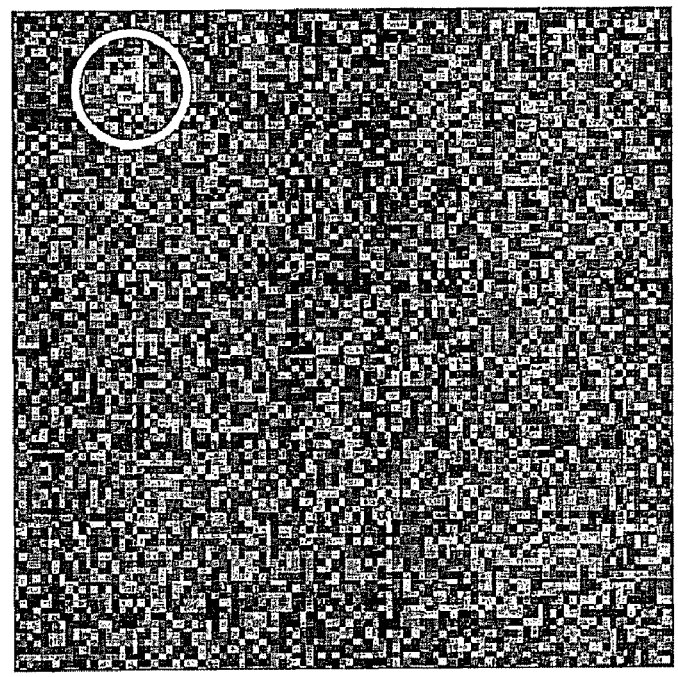

FIGS. 5A and 5B respectively display [0, 100] count per second of random noise in the unit square, in a standardized detector, at a sample location and a source defined as 5,000 counts per second source in a standardized detector, a short distance from the center of a unit square, immersed in that noise (shown circled). This illustration sketches the power of viewing a geographic area as a low-light gamma image is photographed by an army of roving photon receptors within the detectors 105, 200. Employed are image convolution software tools. As the wanderers walk, they uncover more of the picture. In a reasonably short time, they have uncovered nearly all of it. Consider a 100×100 meter area "photographed" by a 100×100 array of pixels. A given wanderer detects, say, 1 square meter or 1 pixel at any given moment. The value assigned to each pixel in this picture can bes the count rate received at a sample, small, known-area, known efficiency, detector node, standing in the center of that pixel. This is represented by gray scale—black is zero, white is a high number.

In this basic example, consider a point source producing 5,000 counts/sec in a small detector when the detector is 10 centimeters from that source. The source is randomly located in the 100 meter square. Noise is then overlaid, a random number between [0,100] for every pixel location, and a signal is added with the noise to produce a superposition of the two. The noisy-source-image is then convolved with an image of a generalized pure source. From the convolution of pure source and data, the algorithm quickly locates the "bright spot" which is where the photon source is located. The goal is to find a gamma source in the midst of noise; this method finds the gamma source even when it is buried.

When the images are convolved, the algorithm looks for the maximum of the convolution. In this case the "real" source location was {x,y} (11, 17), and the convolution algorithm "found" it at (9, 17)—an error of 2 pixels (meters). As we increase the noise and decrease the strength of the source, the source to the human eye in these pictures disappears. But the geometric nature of the inverse square signal is still separable from the noise because the noise is not varying spatially. The nuclear device is thus locatable. This is a variation of technique used by astronomers to locate stars in CCD camera images.

For noise [0,100] count/sec and an initial brightness of 500 count/sec, under otherwise identical conditions, the device located at (7, 53) was calculated to be at (6, 52), an error of 1.4 pixels (meters). For noise [0,100] and an initial brightness of 200, the bright spot now not visible to the eye, the machine finds the spot to high repeatability. Now, assume an initial count rate in a generic detector of 200 counts/sec 10 cm from the source, and a background of 35 counts/sec. Repeating the test 100 times, a mean of 1.47 pixels error is found as is a standard deviation of 0.37 pixels in predicting the source location. Under entirely reasonable real-world conditions of 100 counts/sec initial brightness, and a noise presence of 15 counts/sec in our sample detector, an average error of 1.44 pixels and a standard deviation of 0.34 pixels is found. This detection rate is at a level fairly described as being able to find the source every time.

In Table 2, shown below, each intensity/noise scenario was repeated 14 times and the results averaged, showing examples of the convolution method's ability to locate amidst noise. Out of 100 scenarios, only 13 in the ranges considered had trouble finding the device at high levels of noise, all of which are displayed in Table 2. In the remaining 87 scenarios of high noise, 13 of which are displayed in Table 2, strong finding was observed.

TABLE 2

| Missed by | Stdev | Initial intensity | Noise | Missed by | Stdev | Initial intensity | Noise |
|---|---|---|---|---|---|---|---|
| 9.81 | 21.46 | 50 | 23 | 1.55 | 0.27 | 55 | 21 |
| 17.30 | 31.64 | 50 | 21 | 1.59 | 0.32 | 50 | 19 |
| 8.37 | 25.90 | 55 | 23 | 1.59 | 0.51 | 65 | 23 |
| 8.86 | 19.15 | 60 | 23 | 1.53 | 0.23 | 60 | 21 |
| 8.35 | 25.67 | 60 | 19 | 1.49 | 0.26 | 50 | 17 |
| 7.53 | 22.66 | 75 | 23 | 1.48 | 0.39 | 70 | 23 |
| 8.19 | 24.72 | 55 | 15 | 1.54 | 0.21 | 50 | 15 |
| 7.50 | 22.83 | 75 | 17 | 1.34 | 0.29 | 70 | 21 |
| 3.41 | 8.02 | 55 | 11 | 1.52 | 0.31 | 65 | 19 |
| 7.01 | 20.59 | 60 | 11 | 2.81 | 4.80 | 60 | 17 |
| 9.85 | 31.17 | 85 | 15 | 1.55 | 0.35 | 70 | 19 |
| 8.49 | 26.16 | 55 | 9 | 1.46 | 0.24 | 85 | 23 |
| 6.82 | 20.18 | 90 | 13 | 1.59 | 0.35 | 80 | 21 |
| pixels (meters) | | counts in detector | | pixels (meters) | | counts in detector | |
| | Did not locate well | | | | Located well | | |

Figure 6:
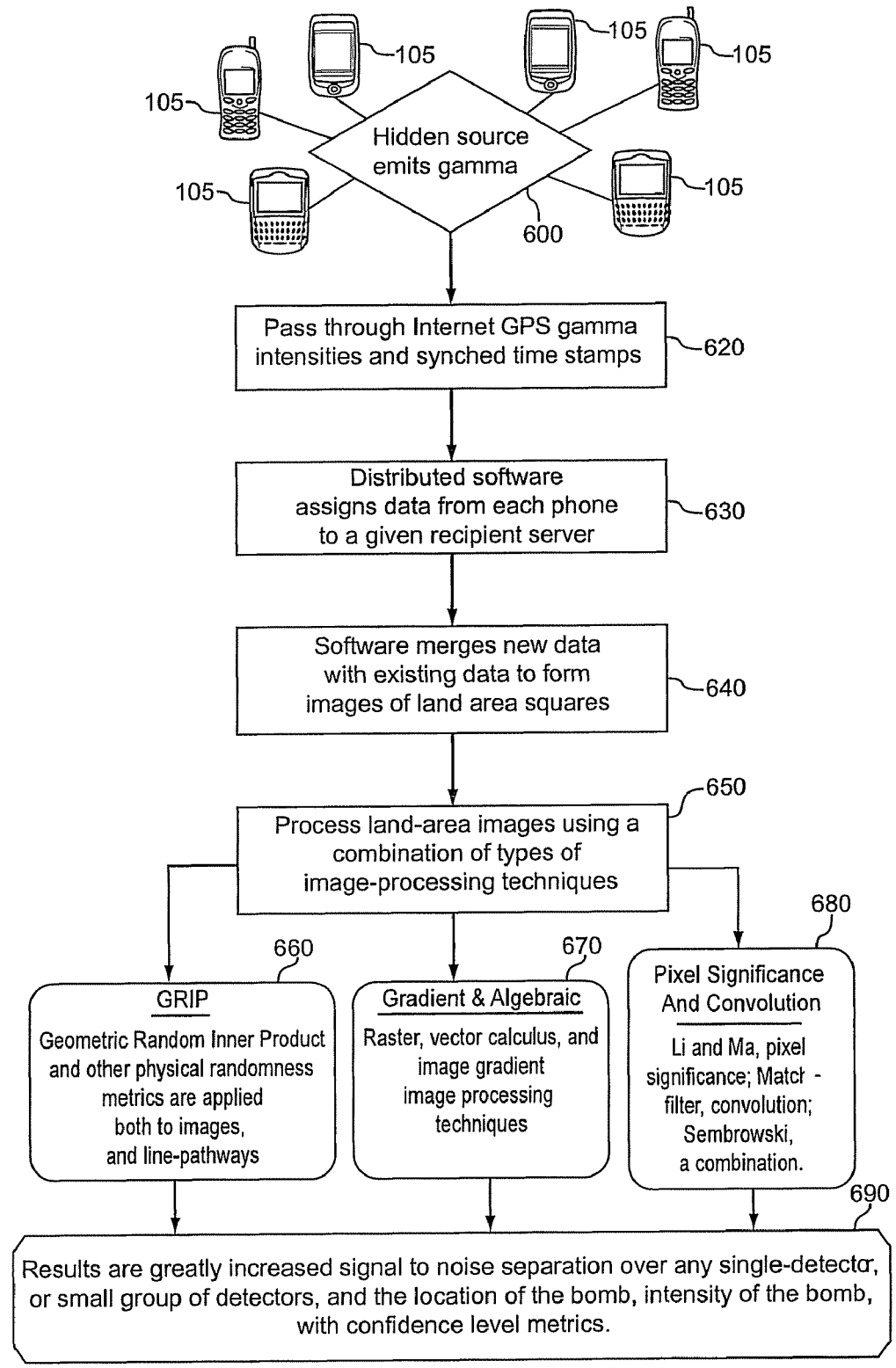
FIG. 6 displays a flow chart overview of an embodiment of the mobile device of FIG. 2 and its functionality within the system herein disclosed.

FIG. 6 displays a flow chart overview of an embodiment of the mobile device 200 of FIG. 2 and its functionality within the system 100. At block 600 is a graphic depicting a hidden bomb emitting gamma radiation to a constellation of the detector node-equipped devices 105. At block 620, radiation emission data passes over the network 120 to the recipient servers 124 as discussed with reference to FIG. 1, wherein the radiation emission data includes GPS geo-positions, gamma intensities, and synched time stamps. At block 630, distributed software of the various recipient servers 124 assigns data from each detector 105 or mobile device 200 to respective recipient servers 124 depending on the geographical responsibility of each. The software, at block 640, merges new emission data with existing emission data to form images of land area squares or other geometric areas. At block 650, the land-area images are processed using at least some of various types of image-processing techniques, delineated as: (1) geometric random inner product (GRIP) at block 660; (2) gradient and algebraic at block 670; and (3) pixel significance and convolution techniques at block 680. Finally, at block 690, the results of combining the image-processing techniques to process the images includes greatly-increased signal to noise separation over any single detector or small group of detectors, and in detection of the location of the bomb and intensity of the bomb with confidence metrics.

Two-dimensional images of radiation background are created constantly from incoming data and, depending on the type of algorithm to be employed, new images only or a combination of old and new images are used. Multiple different algorithms, as disclosed herein, each attack the same problem. Each algorithm or approach has different strengths and weaknesses. For area detection, GRIP or other randomness methods are most sensitive but diffuse—they indicate if something is perhaps generally wrong, provide a quantitative measure, but do not locate strongly or quickly. The gradient and algebraic techniques provide information for moving sources, but are noisier and less focused. The gradient and algebraic techniques perform raster and vector calculus image gradient and other processing techniques. The convolution techniques provide the best locating potential, but require the most complete data sets to operate.

These various approaches are then used to create different regimes of solutions and they all form part of an overall product. It would not be preferable to use only one approach, except under conditions very specific to the needs of that approach. Since the real world does not tailor its situations in this way, all approaches are included in the system 100, combined in various possible embodiments. Using a mixture of these various techniques and mathematical approaches greatly increase signal to noise separation over any single detector 105 or small group of detectors 105, the location of a bomb, intensity of the bomb, and confidence level metrics associated therewith.

Figure 7:
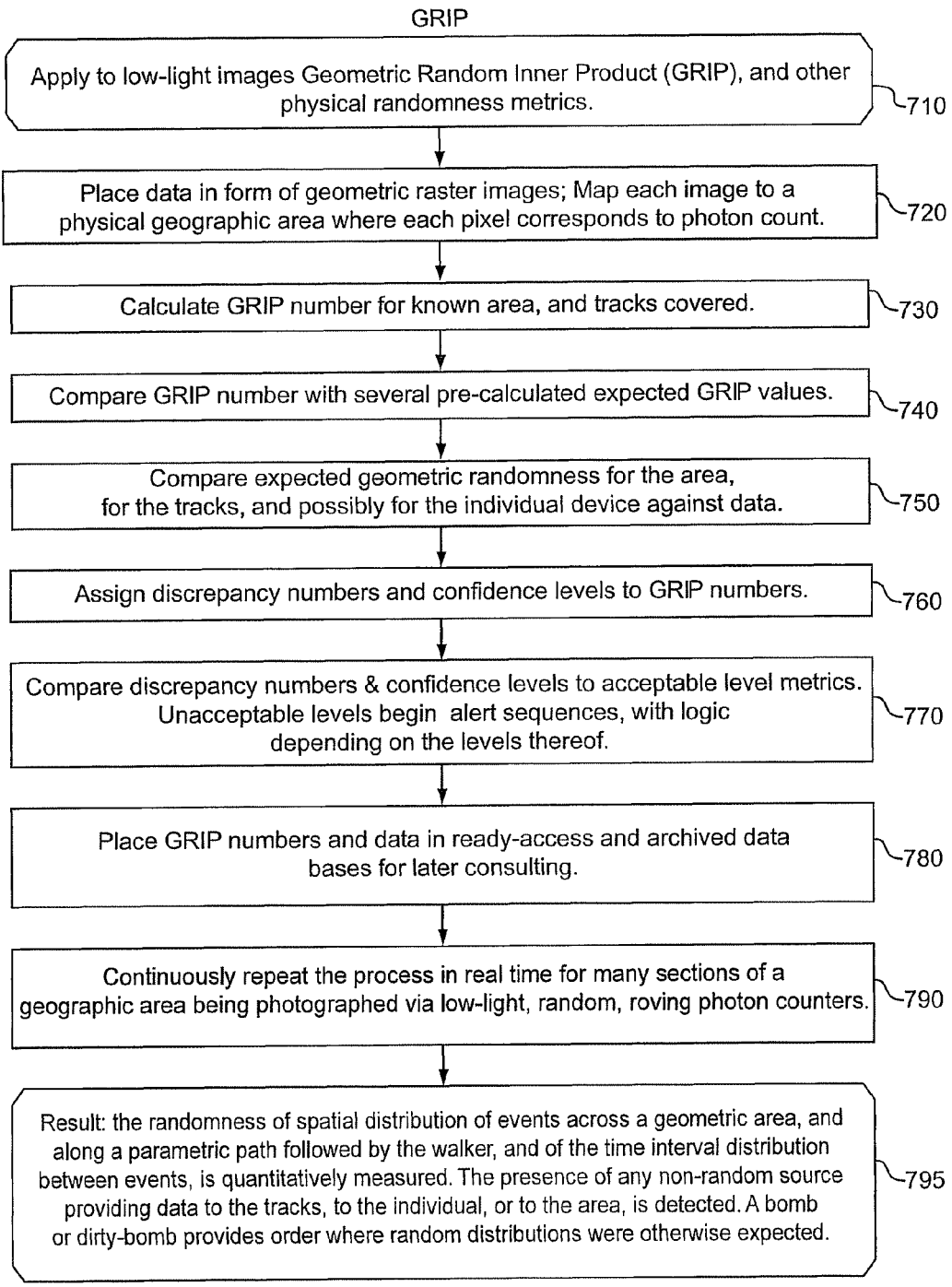
FIG. 7 is a flow chart showing a more detailed embodiment of the Geometric Random Inner Product (GRIP) process shown in FIG. 6.

FIG. 7 is a flow chart showing a more detailed embodiment of the Geometric Random Inner Product (GRIP) process shown in FIG. 6. At block 710, the GRIP process and other physical randomness metrics is especially useful when applied to low-light images. At block 720, data is placed in the form of geometric raster images (such as in a square shape) and each image is mapped to a physical geographic area, each pixel corresponding to a photon count. At block 730, a GRIP number is calculated for known area and tracks covered by individual detectors 105, 200. The GRIP formalism utilizes geometric probability techniques to calculate the average scalar products of random vectors distributed in geometric objects, such as circles and spheres. These average scalar products define a family of geometric constants which can be used to evaluate the quality of random number generators. Tu & Fischbach, *Geometric Random Inner Products: A Family of Tests for Random Number Generators*, Physical Review, E 67, 016113 (Jan. 28, 2003), http://docs.lib.purdue.edu/physics_articles/542. In this case, the GRIP geometric probability techniques may be applied to the random radiation emission found within digital image data in the low-light images, to detect how random the radiation emission data is, and by implication, if a concentrated source of non-random radiation emission exists in the low-light image. This is performed by comparison of calculated GRIP numbers.

Accordingly, at block 740, the GRIP number is compared with several pre-calculated expected GRIP values. At block 750, the expected geometric randomness for the area, for the tracks, and possibly for the individual device 105, 200, are compared against the new data. At block 760, any discrepancy in GRIP numbers is assigned, as are confidence levels. At block 770, discrepancy and confidence numbers are compared to acceptable level metrics pre-set up by the system 100; unacceptable levels begin alert sequences, with logic depending on the levels thereof. At block 780, the GRIP numbers and data are then placed in read-access memory 140 and archived databases 142 for later consulting. At block 790, the process is continuously repeated in real-time and constantly for many sections (squares, for instance) of geographic areas being photographed by low-light, random, roving photon counters, such as the detectors 105, 200.

The result, at block 795, is that the following factors are quantitatively measured: the randomness of spatial distribution of events across a geometric area, along the parametric path followed by the walker, and in the time intervals between events. In some alternative embodiments, these factors can be qualitatively measured both on a per pixel basis and/or a per detector node 105 basis. The presence of any non-random source can be detected from the data in the tracks, from the individual, or pertaining to the area. A bomb or dirty-bomb provides order where random distributions are otherwise expected and known.

Figure 8:
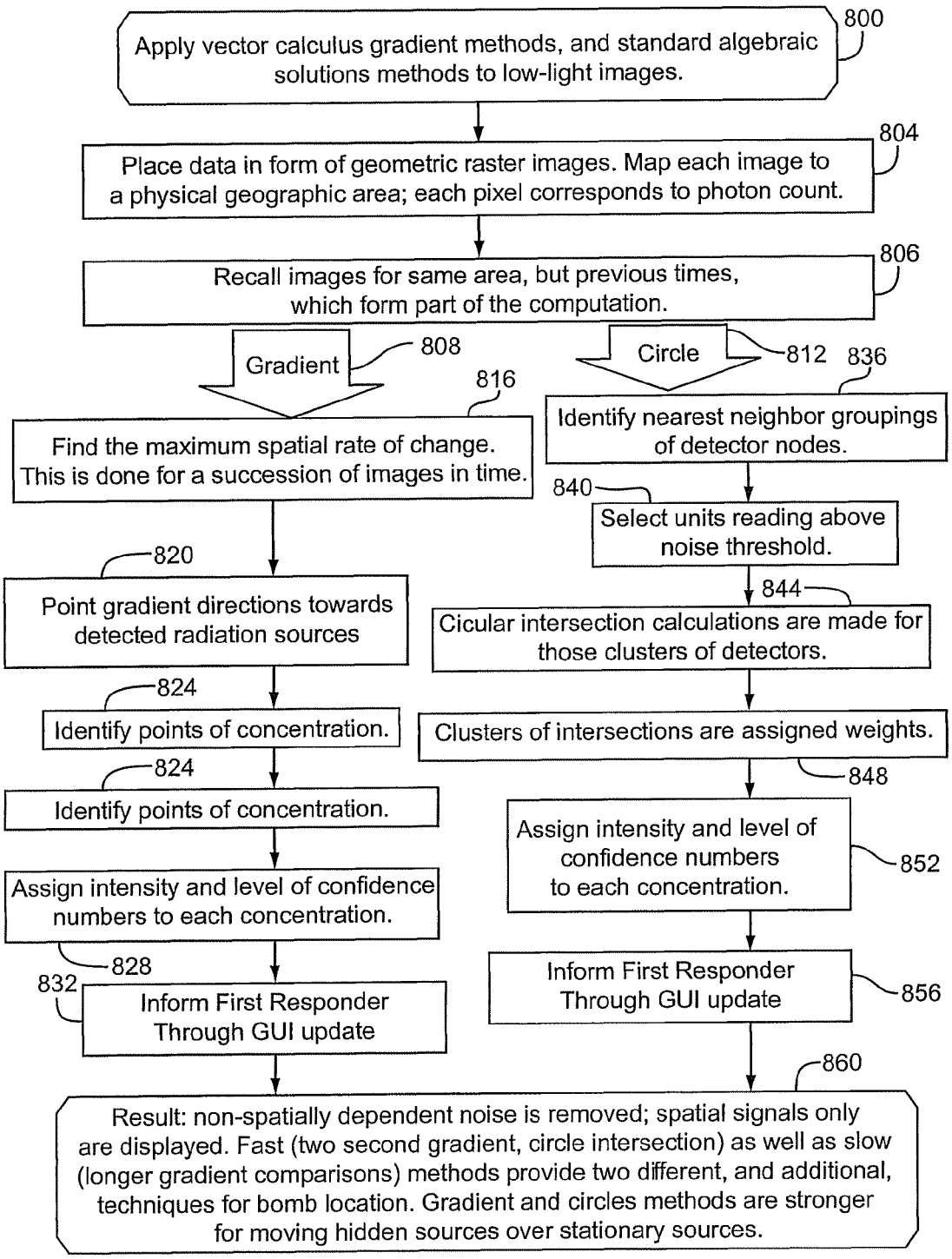
FIG. 8 is a flow chart showing a more detailed embodiment of the gradient and algebraic process shown in FIG. 6.

FIG. 8 is a flow chart showing a more detailed embodiment of the gradient and algebraic process shown in FIG. 6. At block 800, vector calculus gradient methods and standard algebraic solution methods are generally applied to low-light images. As data arrives, at block 804, it is placed in a form of geometric raster images (such as in squares) so that each image maps to a physical geographic area. Each pixel corresponds to a photon count. At block 806, images are recalled from the database 142 that correspond to previously-saved images for the same geographical area. These images form part of the computation.

At block 808, a path for a gradient is taken, and at block 812, a path for a circle is taken. For gradient analysis of images, starting at block 816, a spatial rate of change is found for a succession of images in time. Short, medium, and long time periods for last known good images are used. If a source is present, at block 820, a gradient direction will point towards it. At block 824, points of concentration are identified. At block 828, intensity and level of confidence numbers are assigned to each concentration. At block 832, a user such as a first responder is alerted or informed through the GUI 164 so that decision-making may occur.

For circular analysis, starting at block 836, the nearest neighbor groupings of detector nodes are identified. At block 840, units reading above noise thresholds are selected. At block 844, circular intersection calculations are made for those clusters of selected detectors. At block 848, clusters of intersections are also assigned weights. At block 852, intensity and level of confidence numbers are assigned to each concentration. At block 856, a user such as a first responder is alerted or informed through the GUI 164 so that decision-making may occur. Note that varying geometric analysis, including geometric shapes other than circular intersections, may similarly be implemented and added as optional methods in differing embodiments. In an alternative embodiment, non-uniform or randomly determined shapes may be implemented.

At block 860, the gradient and algebraic methods result in removal of non-spatially varying noise. Spatially varying signals only are displayed. Fast methods (fast gradient and/or circle intersection) as well as slower methods (longer gradient comparisons, more complete data set convolutions) provide two different, algorithms for bomb location. Gradient and geometric methods are stronger for moving hidden sources as compared with location of stationary sources.

Several algorithms within the family loosely referred to at block 680 as pixel significance with image convolution are employed by the computing of the networked system 100 in order to locate bomb features in the low-light digital photographs generated by the detectors 105. These techniques include those pixel significance techniques based upon Li and Ma pixel significant techniques, match-filter (convolutions), and a combination of pixel significances and convolutions. The application of these methods as an integral part of the system 100 set forth, achieves a result which greatly amplifies the signal-to-noise (S/N) results normally ascertained with only single-device detection or small-number device detection.

The structure of the system 100 further allows the bomb-location problem to be solved in terms of gamma-ray astronomy and/or CCD camera image processing techniques. While each individual technique from gamma-ray astronomy used are of interest to varying degrees, it is noteworthy that the overall structure of the system 100 allows the power of all the image process learning from the fields of gamma-ray imaging to be unlocked and applied. Convolution techniques, noise significance techniques, dark-current pixel significance, sharpness, gradients, and a host of other computational physics image tools may be applied to the bomb location problem, due to the innovations presented by the sea of nodes capturing low-light gamma photographs repeatedly.

System 100 can also elucidate bomb location based upon industrial image processing techniques. Because the problems have been expressed as essentially an image-processing problem, hundreds of industrial image processing routines may now likewise be brought to bear. In each image analysis case, an M×N raster image, which represents photon counts at specific geographic locations, is fed into an image processing algorithm. Here, examined in more detail is each of three convolution-type methods of image processing, which may be performed by the image processor 144 of the statistics server 134. The digital images are operated upon by computational mathematics in order to achieve best-measurement statistics which indicate the location and strength of a hidden nuclear device.

The preparations of images that are fed into the system 100 are such that they contain sufficient data. Images containing too little data, as in the case of individual detectors or small numbers of widely separated detectors, are of little use. The present methods apply in a regime wherein detector density is sufficiently ubiquitous to provide data that substantially fills out the images with photon count data. This fact separates the proposed detector 105 from single detectors, or small-number groups thereof, and also is prerequisite for its greatly outperforming those types of detectors.

The General Spatial Convolution Method—Match-Filter Technique

Consider a field data image a, m×n pixels, constructed of field data, where many pixels have been assigned a value according to roving, random, low-light, photon counters such as the detectors 105, 200. Consider a second image which serves as the archetypal bomb reference image. This bomb-reference-image, which we call the filter, h, j×k, consists of a normalized, single, bright, $1/r^2$, photon source, placed in the center of the matrix, and scaled to the dimensions of the matrix.

The spatial convolution c of a and h is then defined to be the following sum:

$$c[m,n] = \sum_{j=0}^{M-1} \sum_{k=0}^{M-1} a[j,k]h[m-j, n-k]$$

This is a recognized, canonical, powerful image processing method, applied here to process the multitude of images from widely dispersed detectors to locate a concealed nuclear device or material. Hence the system 100 altogether produces a sum greater than its disparate parts.

Pixel Significance—E.g., Li and Ma

The process of defining the level of confidence that a given pixel of data contains signal, as opposed to noise, can be addressed in part by the methods of Li and Ma. By measuring non-signal conditions and subsequent signal conditions, a careful study of statistics can render a significance measure based on the properties of Poisson statistics. See generally Li and Ma, *Analysis Methods for Results in Gamma-Ray Astronomy*, The Astrophysical Journal, 272: 317-324 (Sep. 1, 1983).

Under various conditions, then, a pixel figure of significance is assigned to each pixel. Here, $N_{on}$ is the number of photons collected during the data collection time, $N_{off}$ is the number of photons collected during a noise-only collection time, and α is the ratio of time collecting the $N_{on}$ photons to the time collecting the $N_{off}$ photons. S is the quantitative significance that a measurement collected represents real signal, instead of noise. From Li and Ma:

$$S = \sqrt{-2\ln\lambda} = \sqrt{2}\left\{N_{on}\ln\left[\frac{1+\alpha}{\alpha}\left(\frac{N_{on}}{N_{on}+N_{off}}\right)\right] + N_{off}\ln\left[(1+\alpha)\left(\frac{N_{off}}{N_{on}+N_{off}}\right)\right]\right\}^{1/2}$$

Id. at Equation 17.

While this algorithm provides a raw signal measure for basic significance benchmarking, it does not quantify the spatial nature of a signal which determines the presence of a hidden object, per se. But, this method represents a good benchmark for quantifying the performance of single-detector alerting. It, therefore, becomes a metric for determining whether an individual detector node has exceeded acceptable levels. The constellation of devices compute this figure of significance against an $N_{off}$ figure acquired earlier and stored in the database 142, updated as internet or network communications allow. A two-dimensional convolution exceeds the power to report on the significance of a given signal level, over and above (this) single point metric. Whereas this technique originated in astronomy, it is employed here to characterize the effectiveness of the pixels which are being created by the networked system 100 of detectors 105 disclosed herein.

Refined Convolution-Like Techniques—E.g., Sembrowski

The two-dimensional convolution can be specialized to the specific conditions of bomb detection. There is a large family of techniques that fall under the general category of image convolution. Additions to these methods are envisioned by the system 100 and methods disclosed herein. Generalizing the methods of Li and Ma to two-dimensional arrays is being done by other physicists at the University of the Applicants. By summation of the figures of significance, and via weighting those figures, helpful metrics for two-dimensional pixel significance are created.

Refined convolution-like techniques, such as Sembrowski, are applied in analysis of the digital image data gathered by the radiation detectors 105, 200: they are convolution methods that in addition apply pixel significance techniques as part of convolving of two-dimensional sources of image data, e.g., from multiple detectors 105, 200. Sembrowski et al. noted that the techniques of Li and Ma work reasonably well for pointed observations, that is, when the object of interest is a dot. However, there are often interesting potential gamma-ray sources in which the emission is expected to be extended rather than point like, or for which an accurate position is unknown—as in bomb detection. G. H. Sembrowski, et al., *Likelihood Method for 2-D Gamma-Ray Source Detection*, Proceedings of the 30th International Cosmic Ray Conference, Mérida, México, Purdue, Depauw, UCLA (2007); http://indico.nucleares.unam.mx/contributionDisplay.py?contribId=699&sessionId=40&confId=4. Sembrowski et al. noted that, in the case of a sky survey, both the existence, location, and shape of potential sources are unknown. In these cases, the location of each event is reconstructed by some method, and a 2-D map is created of photon events.

A gamma-ray point source, a bomb, would not show up as a single point in the field of view. There is an intrinsic point-spread function associated with the reconstruction of the gamma-rays' origin, the shape of which is neglected by the typical on/off (Li and Ma) procedure. Sembrowski et al is an example of supplying matched filters of both bomb shape and noise shape, which increase the power of the system to detect.

In order to overcome the single-point shortcomings of typical 2-D analysis for potential sources of unknown location and shape, Sembrowski et al. developed a maximum likelihood method to search for gamma-ray signals in fields of non-zero noise. Sembrowski's maximum-likelihood method was developed to test two hypotheses: (1) that data is best fit by background; and (2) that it is best fit by background plus a gamma-ray signal. This method requires models of the background and of the point-spread functions for the gamma-ray source. Where Sembrowski's principle background model is generated from Monte Carlo simulations, we have a very large statistical base of real, measured, background which would be used in the calculation. Sembrowski et al. mention this, also generating back-ground models based on data containing no gamma-ray sources (e.g., exists a plethora of "off-source" or "dark" observations).

The background model is a 2-D histogram which represents the expected outcome of a run which contains no sources of gamma-rays. The back-ground model, which is data we collect from the sea of detectors where no bomb is present, is normalized such that the total count in the normalized 2-D histogram, for a given geographical area of interest, is one. The normalized values of each bin in the background histogram are called $w_j$. So as definition:

$$\sum_j w_j = 1. \quad (1)$$

We then consider the hypothesis that the incoming gamma detection data is best fit by a pure background model, where that background is derived from data collected previously.

The observed number of events in bin j of the histogram is $n_j$. The expected background value of bin j would be:

$$\mu_j = Bw_j \qquad (2)$$

where B is the total number of counts in the data histogram (measured earlier and entirely due to background). We define that the population in a bin as following a Poisson distribution. Here, $\mu_j$ is the mean of the Poisson distribution. So, the probability of observing the value $n_j$ in bin j is found via:

$$P(n_j) = \frac{\mu_j^{n_j}}{n_j!} e^{-\mu_j}. \qquad (3)$$

The probability that a particular new set of data is due to the background can be found via the product of Poisson probabilities for each bin in the 2D data:

$$L_{background} = \prod_j \frac{\mu_j^{n_j}}{n_j!} e^{-\mu_j} = \prod_j \frac{(Bw_j)^{n_j}}{n_j!} e^{-Bw_j}. \qquad (4)$$

$L_{background}$ in equation 4 is called the likelihood function. The value of B in equation 2 is chosen to maximize the probability that the data is consistent with the background model. Finding this maximum probability places a bound and confidence level on whether or not observed data is due strictly to previously measured background.

Similar mathematics are used to test and quantify whether the data is best fit by the presence of background plus a source signal, a bomb. In this case, the expected value of bin j is the sum of signal and background:

$$\mu_j = Sa_j^k + Bw_j. \qquad (5)$$

Here S is the total number of counts due to a source signal, a signal that has shape. $a_k^j$ is the normalized model signal contribution for bin j when the gamma-ray signal is centered in bin k and B is the total counts due to background. The likelihood function for the probability that the data is fit by a background plus signal, $L_{signal}$, is just equation 4, but with the $\mu$ given by equation 5 (bomb plus noise) instead of equation 2 (noise only). The chosen and employed values of B and S are determined by maximizing this likelihood function. Equation 4 is solved numerically.

Tieing these together in a test for whether the incoming data is best fit by the background or by background plus a bomb, we examine the ratio of the likelihoods: $L_{backgroud}/L_{signal}$:

$$R = -2\log\left(\frac{L_{backgound}}{L_{signal}}\right) \qquad (6)$$

R follows a $\chi^2$ distribution with one degree of freedom. For pixel in the geographic data, the value of R is obtained assuming the signal is centered in that pixel. The resulting 2-D map of $\chi^2$ numbers is converted into equivalent probability values. These values give a pixel-by-pixel probability that the data is best fit by the background alone. Since R follows a $\chi^2$ distribution with one degree of freedom, $\sqrt{R}$ is the equivalent standard deviation value of the probability. Confidence levels are assigned.

Individual tracks are created as the walkers progress through the defined areas or matching geographic areas, which necessitate constructing methods that function on partial data and converge to full understanding. Traditional convolution is therefore modified by using only partially-exposed pictures, that is data sets revealed by random-tracks through the geographic areas. The filters are adapted specifically to handle these cases. Calculations are performed using masks, which are cut by the paths of the random walkers in the field. This process is highly detailed and beyond the scope of this disclosure. Suffice it to say, however, that a variety of filters for match-filter convolution are created based on science as to bomb, mapped pixel data, and other specific constraints presented by analysis of the digital image data and physical situation 105, 200.

The methods disclosed herein include one or more steps or actions for performing the described methods. The method steps and/or actions may be interchanged with one another. In other words, unless a specific order of steps or actions is required for proper operation of the embodiment, the order, and/or use of specific steps, and/or actions may be modified without departing from the scope of the disclosure.

The embodiments may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware.

Embodiments may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, propagation media or other type of media/machine-readable medium suitable for storing electronic instructions. For example, instructions for performing described processes may be transferred from a remote computer (e.g., a server) to a requesting computer (e.g., a client) by way of data signals embodied in a carrier wave or other propagation medium via a communication link (e.g., network connection).

The invention claimed is:

1. A radiation detection system comprising:
   a receiver configured to continuously receive radiation emission data from at least some of a sufficient density of dispersed detectors capable of communicating geopositions and photon emission counts over a wireless network, wherein the radiation emission data includes gamma intensities, time stamps, and geo-positions affiliated therewith reported in real time;
   a processor coupled with the receiver and configured to build digital image data of the received radiation emission data for a geographic area by treating emission data from each dispersed detector as an image pixel in a low-light image;
   a database coupled with the processor, to store the digital image data;
   wherein the processor is configured to continuously execute a plurality of statistical computational analyses on the digital image data to separate detected radiation signals from random, undesired signal noise, wherein the plurality of statistical computational analyses comprise match-filter, other convolution techniques, or a combination thereof; and
   an interface configured to report to a user when the plurality of statistical computational analyses result in detection of a radiation signal and to report a location of one or more of the dispersed detectors that contribute to the detection.

2. The system of claim 1, wherein the time stamps are generated from network time protocol (NTP) built into a cellular network that syncs local time of a mobile device clock-calendar with an atomic clock-linked, standards-traceable, Internet Time Service.

3. The system of claim 1, wherein the processor is configured to:
combine the digital image data with previously-saved image data of a matching geographic area to form time-updated digital image data for the geographic area; and
save the updated digital image data in the database.

4. The system of claim 3, further comprising:
a plurality of image processors; and
distributed software code executable by the processor to assign radiation emission data from each dispersed detector to one or more of the plurality of image processors.

5. The system of claim 3, wherein the other convolution techniques comprise image processing and noise significance techniques used in gamma-ray astronomy or charge-coupled device (CCD) cameras, including dark-current pixel significance techniques.

6. The system of claim 3, wherein the plurality of statistical computational analyses comprise: a pixel significance technique; and/or a two-dimensional convolution technique that applies, in part, a pixel significance technique.

7. The system of claim 3, wherein the processor is configured to place the digital image data in a form of geometric raster images, wherein each pixel corresponds to photon count within the received radiation emission data.

8. The system of claim 7, wherein the plurality of statistical computation analyses comprises applying physical randomness metrics to the digital image data.

9. The system of claim 8, wherein the physical randomness metrics comprises geometric random inter product (GRIP), wherein the processor is configured to:
calculate a GRIP number for known geographic areas and for tracks through the known geographic areas;
compare each GRIP number with a plurality of pre-calculated, expected GRIP values for the same geographic areas and tracks;
assign discrepancy numbers and confidence levels to each GRIP number based on the comparison;
compare discrepancy numbers and confidence levels to a plurality of acceptable metrics levels; and
begin an alert sequence through the interface in response to, and in correlation with, an unacceptable metric level in discrepancy numbers and confidence levels;
wherein the GRIP number and values, discrepancy numbers, and confidence levels are saved in the database for later comparison during subsequent statistical analyses of a matching geographic area.

10. The system of claim 7, wherein the plurality of statistical computational analyses comprises a gradient analysis, wherein the processor is configured to:
find a maximum two-dimensional or three-dimensional spatial rate of change between a plurality of time-wise successive images retrieved from the database;
signal gradient directions with spatial rates of change by assigning intensity and confidence level numbers to the pixels within the digital image data that indicate to what extent a concentrated source of detected radiation exists, and where it is located; and
alert the user through the interface in response to the intensity and confidence levels meeting a certain combination of intensity and confidence levels that indicate to the user a potentially dangerous concentration of radioactive material.

11. The system of claim 7, wherein the plurality of statistical computation analyses comprises algebraic analysis, wherein the processor is configured to:
identify any nearest neighbor groupings of the dispersed detectors;
select a plurality of dispersed detectors from each grouping that provide gamma intensities above a determined noise threshold, wherein the selected plurality of dispersed detectors from each grouping comprises a cluster;
calculates algebraic circular intersections, where the algebraic circular intersection indicate a source location or a point of origin location, where the source location or point of origin location are based upon the signal intensities observed in each member detector of the cluster;
assign weights to each of the algebraic circular intersections by treating the groupings of clusters statistically and spatially, and applying GRIP or other distribution measuring algorithms thereto;
assign intensity and confidence levels to each cluster; and
alert the user through the interface in response to the intensity and confidence levels being a combination that calls for importance investigation of a potentially dangerous concentration of radioactive material.

12. The system of claim 1, wherein the dispersed detectors comprise cellular phones, personal digital assistants (PDA's), pagers, laptops, Bluetooth devices, global positioning system (GPS) navigation devices, mobile devices, automobiles, fixed-position detectors, or a combination thereof.

13. The system of claim 12, wherein some of the dispersed detectors comprise gamma detectors that include at least one of a Geiger-Müller detector tube, a silicon wafer detector, a scintillator detector, or a combination thereof.

14. A distributed radiation-detection network comprising:
a plurality of distributed recipient servers coupled with a network to continuously receive radiation emission data from at least some of a sufficient density of dispersed detectors capable of communicating geo-positions and photon emission counts over the network, wherein the radiation emission data includes gamma intensities, time stamps, and geo-positions affiliated therewith provided in real time;
a statistics server coupled with at least some of the recipient servers, the statistics server having a processor configured to build digital image data of the received radiation emission data for a geographic area by treating emission data from each dispersed detector as an image pixel in a low-light image of the geographic area, the processor configured to continuously execute a plurality of statistical computational analyses on the digital image data to separate detected radiation signals from historically normal levels of noise, wherein the plurality of statistical computational analyses comprise a pixel significance technique, a two-dimensional convolution technique that applies, in part, a pixel significance technique, or a combination thereof;
a database coupled with the statistics server to continuously store updated digital image data as it is processed by the plurality of statistical computational analyses; and
a mapping server coupled with the statistics server and configured to continuously receive the processed digital image data from the statistics server, the mapping server having a graphical user interface to overlay the processed digital image data on top of a geographical-matching map for viewing by a first responder, wherein a statistically significant new source of radiation within the geographic area is displayed to the first responder in real time.

15. The network of claim 14, wherein the time stamps are generated from network time protocol (NTP) built into a cellular network that syncs local time of a mobile device clock-calendar with an atomic clock-linked, standards-traceable, Internet Time Service.

16. The network of claim 14, wherein the statistically significant new source of radiation comprises one or more of bomb locations, intensities, percent confidence metrics, and a combination thereof.

17. The network of claim 14, wherein the plurality of statistical computational analyses comprise convolution techniques, including image processing and noise significance techniques selected from a group consisting of match-filter and dark-current pixel significance techniques.

18. The network of claim 14, wherein known nuclear sources that are on the move within the geographical area each carry a detection node traceable by the plurality of recipient servers, wherein the processor is configured to remove the known nuclear sources from the digital image data.

19. The network of claim 14, wherein the statistics server comprises:
   a plurality of image processors; and
   distributed software code executable by the processor to assign radiation emission data from each dispersed detector to one or more of the plurality of image processors.

20. The network of claim 14, wherein the processor is configured to place the digital image data in a form of geometric raster images, wherein each pixel corresponds to photon frequency within the received radiation emission data such that the digital image data includes multiple low-light images captured as layers of increasing photon energy.

21. The network of claim 20, wherein the plurality of statistical computation analyses comprises applying physical randomness metrics to the digital image data.

22. The network of claim 21, wherein the physical randomness metrics comprises geometric random inter product (GRIP), wherein the processor is configured to:
   calculate a GRIP number for known geographic areas and for tracks through the known geographic areas;
   compare each GRIP number with a plurality of pre-calculated, expected GRIP values for the same geographic areas and tracks;
   assign discrepancy numbers and confidence levels to each GRIP number based on the comparison;
   compare discrepancy numbers and confidence levels to a plurality of acceptable metrics levels; and
   begin an alert sequence through the interface in response to, and in correlation with, an unacceptable metric level in discrepancy numbers and confidence levels;
   wherein the GRIP number and values, discrepancy numbers, and confidence levels are saved in the database for later comparison during subsequent statistical analyses of a matching geographic area.

23. The network of claim 20, wherein the plurality of statistical computational analyses comprises a gradient analysis, wherein the processor is configured to:
   find a maximum two-dimensional or three-dimensional spatial rate of change between a plurality of time-wise successive images retrieved from the database;
   signal gradient directions with spatial rates of change by assigning intensity and confidence level numbers to the pixels within the digital image data that indicate to what extent a concentrated source of detected radiation exists, and where it is located; and
   alert the user through the interface in response to the intensity and confidence levels meeting a certain combination of intensity and confidence levels that indicate to the user a potentially dangerous concentration of radioactive material.

24. The network of claim 20, wherein the plurality of statistical computation analyses comprises algebraic analysis, wherein the processor is configured to:
   identify any nearest neighbor groupings of the dispersed detectors;
   select a plurality of dispersed detectors from each grouping that provide gamma intensities above a determined noise threshold, wherein the selected plurality of dispersed detectors from each grouping comprises a cluster;
   calculate a circular intersection for each cluster;
   assign weights to each circular intersection by treating the groupings of clusters statistically and spatially, and applying GRIP or other distribution algorithms thereto;
   assign intensity and confidence levels to each cluster; and
   alert the user through the interface in response to the intensity and confidence levels being a combination that calls for importance investigation of a potentially dangerous concentration of radioactive material.

25. The network of claim 20, wherein the dispersed detectors comprise cellular phones, personal digital assistants (PDA's), pagers, laptops, Bluetooth devices, global positioning system (GPS) navigation devices, mobile devices, automobiles, fixed-position detectors, or a combination thereof.

26. The network of claim 25, wherein some of the dispersed detectors comprise a Geiger-Müller detector tube, a silicon wafer, a scintillator, or a combination thereof.

27. A computer-implemented method for detection of radiation within a geographical area, comprising:
   continuously receiving by a receiver radiation emission data from at least some of a sufficient density of dispersed detectors capable of communicating geo-positions and photon emission counts over a wireless network, wherein the radiation emission data includes gamma intensities, time stamps, and geo-positions affiliated therewith reported in real time;
   building digital image data for a geographical area by a processor coupled with the receiver, wherein the digital image data is built though combining the radiation emission data from each dispersed detector as an image pixel in a low-light image;
   storing the digital image data in a database coupled with the processor;
   continuously executing, by the processor, a plurality of statistical computational analyses on the digital image data to separate detected radiation signals from random, undesired signal noise, wherein the plurality of statistical computational analyses comprise match-filter, other convolution techniques, or a combination thereof; and
   displaying, through an interface coupled with the processor, a report to a user when the plurality of statistical computational analyses result in detection of a radiation signal, including a location of one or more of the dispersed detectors that contribute to the detection.

28. The method of claim 27, wherein the time stamps are generated from network time protocol (NTP) built into a cellular network that syncs local time of a mobile device clock-calendar with an atomic clock-linked, standards-traceable, Internet Time Service.

29. The method of claim 27, further comprising:
combining the digital image data with previously-saved image data of a matching geographic area to form time-updated digital image data for the geographic area; and
saving the updated digital image data in the database.

30. The method of claim 29, wherein the other convolution techniques comprise image processing and noise significance techniques used in gamma-ray astronomy or charge-coupled device (CCD) cameras, including dark-current pixel significance techniques.

31. The method of claim 29, wherein the plurality of statistical computational analyses comprise: a pixel significance technique; and/or a two-dimensional convolution technique that applies, in part, a pixel significance technique.

32. The method of claim 29, further comprising:
placing the digital image data in a form of geometric raster images, wherein each pixel corresponds to photon count within the received radiation emission data.

33. The method of claim 32, wherein the plurality of statistical computation analyses comprises applying physical randomness metrics to the digital image data.

34. The method of claim 33, wherein the physical randomness metrics comprises geometric random inter product (GRIP), the method further comprising:
calculating a GRIP number for known geographic areas and for tracks through the known geographic areas;
comparing each GRIP number with a plurality of pre-calculated, expected GRIP values for the same geographic areas and tracks;
assigning discrepancy numbers and confidence levels to each GRIP number based on the comparison;
comparing discrepancy numbers and confidence levels to a plurality of acceptable metrics levels; and
beginning an alert sequence through the interface in response to, and in correlation with, an unacceptable metric level in discrepancy numbers and confidence levels;
wherein the GRIP number and values, discrepancy numbers, and confidence levels are saved in the database for later comparison during subsequent statistical analyses of a matching geographic area.

35. The method of claim 32, wherein the plurality of statistical computational analyses comprises a gradient analysis, the method further comprising:
finding a maximum two-dimensional or three-dimensional spatial rate of change between a plurality of time-wise successive images retrieved from the database;
signaling gradient directions with spatial rates of change by assigning intensity and confidence level numbers to the pixels within the digital image data that indicate to what extent a concentrated source of detected radiation exists, and where it is located; and
alerting the user through the interface in response to the intensity and confidence levels meeting a certain combination of intensity and confidence levels that indicate to the user a potentially dangerous concentration of radioactive material.

36. The method of claim 32, wherein the plurality of statistical computation analyses comprises algebraic analysis, the method further comprising:
identifying any nearest neighbor groupings of the dispersed detectors;
selecting a plurality of dispersed detectors from each grouping that provide gamma intensities above a determined noise threshold, wherein the selected plurality of dispersed detectors from each grouping comprises a cluster;
calculating a circular intersection for each cluster;
assigning weights to each circular intersection by treating the groupings of clusters statistically and spatially, and applying GRIP or other distribution algorithms thereto;
assigning intensity and confidence levels to each cluster; and
alerting the user through the interface in response to the intensity and confidence levels being a combination that calls for importance investigation of a potentially dangerous concentration of radioactive material.

37. The method of claim 27, wherein the dispersed detectors comprise cellular phones, personal digital assistants (PDA's), pagers, laptops, Bluetooth devices, global positioning system (GPS) navigation devices, mobile devices, automobiles, fixed-position detectors, or a combination thereof, and wherein some of the dispersed detectors include a Geiger-Müller detector tube, a silicon wafer, a scintillator, or a combination thereof.

38. A computer-implemented method for detection of radiation within a geographical area, comprising:
continuously receiving radiation emission data by a plurality of distributed, recipient servers coupled with a network from at least some of a sufficient density of dispersed detectors capable of communicating geo-positions and photon emission counts over the network, wherein the radiation emission data includes gamma intensities, time stamps, and geo-positions affiliated therewith;
building digital image data of the received radiation emission data with a processor of a second server that is coupled with at least some of the recipient servers, the digital image data being built for a geographic area by treating emission data from each dispersed detector as an image pixel in a low-light image thereof;
continuously executing, by the processor, a plurality of statistical computational analyses on the digital image data to separate detected radiation signals from historically normal levels of noise, wherein the plurality of statistical computational analyses comprise a pixel significance technique, a two-dimensional convolution technique that applies, in part, a pixel significance technique, or a combination thereof; continuously combining the digital image data with previously-saved image data of a matching geographic area to form time-updated digital image data for the geographic area;
storing the updated digital image data in a database coupled with the second server; and
continuously mapping, with the second server, the processed digital image data for display through a graphical user interface (GUI) such that it overlays a geographical-matching map for viewing by a first responder, wherein a statistically significant new source of radiation is displayed to the first responder in real time.

39. The method of claim 38, wherein the time stamps are generated from network time protocol (NTP) built into a cellular network that syncs local time of a mobile device clock-calendar with an atomic clock-linked, standards-traceable, Internet Time Service.

40. The method of claim 38, wherein the statistically significant new source of radiation comprises one or more of bomb locations, intensities, percent confidence metrics, and a combination thereof.

41. The method of claim 38, wherein the plurality of statistical computational analyses comprise convolution techniques, including image processing and noise significance techniques selected from a group consisting of a match-filter and dark-current pixel significance techniques.

42. The method of claim 38, further comprising:
   including a detection node traceable by the plurality of recipient servers with known nuclear sources that are on the move within the geographical area; and
   removing the known nuclear sources from the digital image data.

43. The method of claim 38, wherein the plurality of statistical computation analyses comprises applying physical randomness metrics to the digital image data.

44. The method of claim 43, wherein the physical randomness metrics comprises geometric random inter product (GRIP), the method further comprising:
   calculating a GRIP number for known geographic areas and for tracks through the known geographic areas;
   comparing each GRIP number with a plurality of pre-calculated, expected GRIP values for the same geographic areas and tracks;
   assigning discrepancy numbers and confidence levels to each GRIP number based on the comparison;
   comparing discrepancy numbers and confidence levels to a plurality of acceptable metrics levels; and
   beginning an alert sequence through the interface in response to, and in correlation with, an unacceptable metric level in discrepancy numbers and confidence levels;
   wherein the GRIP number and values, discrepancy numbers, and confidence levels are saved in the database for later comparison during subsequent statistical analyses of a matching geographic area.

45. The method of claim 38, wherein the plurality of statistical computational analyses comprises a gradient analysis, the method further comprising:
   finding a maximum two-dimensional or three-dimensional spatial rate of change between a plurality of time-wise successive images retrieved from the database;
   signaling gradient directions with spatial rates of change by assigning intensity and confidence level numbers to the pixels within the digital image data that indicate to what extent a concentrated source of detected radiation exists, and where it is located; and
   alerting the user through the interface in response to the intensity and confidence levels meeting a certain combination of intensity and confidence levels that indicate to the user a potentially dangerous concentration of radioactive material.

46. The method of claim 38, wherein the plurality of statistical computation analyses comprises algebraic analysis, the method further comprising:
   identifying any nearest neighbor groupings of the dispersed detectors;
   selecting a plurality of dispersed detectors from each grouping that provide gamma intensities above a determined noise threshold, wherein the selected plurality of dispersed detectors from each grouping comprises a cluster;
   calculating a circular intersection for each cluster;
   assigning weights to each circular intersection by treating the groupings of clusters statistically and spatially, and applying GRIP or other distribution algorithms thereto;
   assigning intensity and confidence levels to each cluster; and
   alerting the user through the interface in response to the intensity and confidence levels being a combination that calls for importance investigation of a potentially dangerous concentration of radioactive material.

47. The method of claim 38, wherein the dispersed detectors comprise cellular phones, personal digital assistants (PDA's), pagers, laptops, Bluetooth devices, global positioning system (GPS) navigation devices, mobile devices, automobiles, fixed-position detectors, or a combination thereof, and wherein some of the dispersed detectors include a Geiger-Müller detector tube, a silicon wafer, a scintillator, or a combination thereof.

48. A machine-readable storage medium comprising programming code operable to be executed by a processor, the programming code comprising instructions operable to perform a method comprising:
   continuously receiving by a receiver radiation emission data from at least some of a sufficient density of dispersed detectors capable of communicating geo-positions and photon emission counts over a wireless network, wherein the radiation emission data includes gamma intensities, time stamps, and geo-positions affiliated therewith reported in real time;
   building digital image data for a geographical area by a processor coupled with the receiver, wherein the digital image data is built though combining the radiation emission data from each dispersed detector as an image pixel in a low-light image;
   storing the digital image data in a database coupled with the processor;
   continuously executing, by the processor, a plurality of statistical computational analyses on the digital image data to separate detected radiation signals from random, undesired signal noise, wherein the plurality of statistical computational analyses comprise match-filter, other convolution techniques, or a combination thereof; and
   displaying, through an interface coupled with the processor, a report to a user when the plurality of statistical computational analyses result in detection of a radiation signal, including a location of one or more of the dispersed detectors that contribute to the detection.

49. A machine-readable storage medium comprising programming code operable to be executed by a processor, the programming code comprising instructions operable to perform a method comprising:
   continuously receiving radiation emission data by a plurality of distributed, recipient servers coupled with a network from at least some of a sufficient density of dispersed detectors capable of communicating geo-positions and photon emission counts over the network, wherein the radiation emission data includes gamma intensities, time stamps, and geo-positions affiliated therewith;
   building digital image data of the received radiation emission data with a processor of a second server that is coupled with at least some of the recipient servers, the digital image data being built for a geographic area by treating emission data from each dispersed detector as an image pixel in a low-light image thereof;
   continuously executing, by the processor, a plurality of statistical computational analyses on the digital image data to separate detected radiation signals from historically normal levels of noise, wherein the plurality of statistical computational analyses comprise a pixel significance technique, a two-dimensional convolution technique that applies, in part, a pixel significance technique, or a combination thereof; continuously combining the digital image data with previously-saved image data of a matching geographic area to form time-updated digital image data for the geographic area;

storing the updated digital image data in a database coupled with the second server; and continuously mapping, with the second server, the processed digital image data for display through a graphical user interface (GUI) such that it overlays a geographical-matching map for viewing by a first responder, wherein a statistically significant new source of radiation is displayed to the first responder in real time.

* * * * *